United States Patent
Li et al.

(10) Patent No.: US 12,426,014 B2
(45) Date of Patent: Sep. 23, 2025

(54) METHODS AND APPARATUSES FOR TRANSMITTING AND RECEIVING UPLINK SIGNAL

(71) Applicant: FUJITSU LIMITED, Kawasaki (JP)

(72) Inventors: Guorong Li, Beijing (CN); Lei Zhang, Beijing (CN); Meiyi Jia, Beijing (CN); Yang Lu, Beijing (CN); Xin Wang, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 864 days.

(21) Appl. No.: 17/693,562

(22) Filed: Mar. 14, 2022

(65) Prior Publication Data

US 2022/0210777 A1    Jun. 30, 2022

Related U.S. Application Data

(63) Continuation of application No. PCT/CN2019/116345, filed on Nov. 7, 2019.

(30) Foreign Application Priority Data

Sep. 29, 2019    (WO) ................ PCT/CN2019/109230

(51) Int. Cl.
*H04W 72/044*    (2023.01)

(52) U.S. Cl.
CPC ................................ *H04W 72/044* (2013.01)

(58) Field of Classification Search
CPC ............. H04W 72/044; H04W 72/569; H04W 72/1268; H04W 72/563; H04W 72/21
See application file for complete search history.

(56) References Cited

U.S. PATENT DOCUMENTS

| | | |
|---|---|---|
| 2017/0231011 A1 | 8/2017 | Park et al. |
| 2018/0035332 A1 | 2/2018 | Agiwal et al. |
| 2018/0041858 A1 | 2/2018 | Sheng et al. |

(Continued)

FOREIGN PATENT DOCUMENTS

| | | |
|---|---|---|
| CN | 105979597 A | 9/2016 |
| CN | 108702768 A | 10/2018 |

(Continued)

OTHER PUBLICATIONS

First Notification of Office Action and search report issued by the China National Intellectual Property Administration on Apr. 28, 2023, for corresponding Chinese patent application No. 201980100049.5, with English translation.

(Continued)

*Primary Examiner* — Ashley Shivers
(74) *Attorney, Agent, or Firm* — Myers Wolin, LLC

(57) ABSTRACT

Methods and apparatuses for transmitting and receiving an uplink signal. The method includes: from a media access control layer, instructing a physical layer by a terminal equipment to transmit a first uplink signal on a first time-frequency resource; in the media access control layer, determining that a second time-frequency resource at least partially overlaps the first time-frequency resource in a time domain or a time-frequency domain; and in the media access control layer, comparing first information related to the first uplink signal and second information related to the second time-frequency resource.

13 Claims, 5 Drawing Sheets

(56) References Cited

U.S. PATENT DOCUMENTS

| | | | |
|---|---|---|---|
| 2019/0045546 A1 | 2/2019 | Li | |
| 2019/0320450 A1 | 10/2019 | Li et al. | |
| 2020/0229202 A1* | 7/2020 | Bagheri | H04L 25/0226 |
| 2021/0058820 A1* | 2/2021 | Lee | H04W 28/0268 |

FOREIGN PATENT DOCUMENTS

| | | |
|---|---|---|
| CN | 109479314 A | 3/2019 |
| CN | 110024467 A | 7/2019 |
| CN | 110139384 A | 8/2019 |
| WO | 2018/129325 A1 | 7/2018 |
| WO | 2019/024918 A1 | 2/2019 |
| WO | 2019/154127 A1 | 8/2019 |
| WO | 2021/056581 A1 | 4/2021 |

OTHER PUBLICATIONS

Notification of Reasons for Refusal issued by the Japan Patent Office for corresponding Japanese Patent Application No. 2022-518174, mailed on May 9, 2023 with an English translation.

Mediatek Inc., "On the framework for UL intra-UE prioritisation", Agenda Item: 11.7.3, 3GPP TSG RAN WG2 Meeting #107, R2-1910076, Prague, Czech Republic, Aug. 26-30, 2019.

Nokia et al., "On UCI Enhancements for NR URLLC", Agenda Item: 7.2.6.2, 3GPP TSG RAN WG1 Meeting #98, R1-1908437, Prague, CZ, Aug. 26-30, 2019.

Examination Report issued by the Indian Patent Office for corresponding Indian Patent Application No. 202237013526, dated Aug. 12, 2022, with an English translation.

Extended European Search Report with the supplementary European search report and the European search opinion issued by the European Patent Office for corresponding European Patent Application No. 19946875.2-1215, mailed on Sep. 26, 2022.

Vivo, "Discussion on handling UL multiplexing of transmissions with different reliability requirements", Agenda Item: 7.2.4, 3GPP TSG-RAN WG1 Meeting #92bis, R1-1803848, Sanya, China, Apr. 16-20, 2018.

Qualcomm Inc., "On the scope of intra-UE DL/UL multiplexing", Agenda Item: 11.7.2, 3GPP TSG-RAN WG2 Meeting #103bis, R2-1815600, Revision of R2-1815371, Chengdu, China, Oct. 8-12, 2018.

Nokia (Rapporteur), "E-mail discussion summary [103bis#41] [NR/IIoT] Intra-UE Prioritization (Nokia)", Agenda Item: 11.7.3, 3GPP TSG-RAN WG2 Meeting #104, R2-1817579, Spokane, USA, Nov. 12-16, 2018.

Notice of Preliminary Rejection issued by the Korean Intellectual Property Office for corresponding Korean Patent Application No. 10-2022-7009464, mailed on Jul. 23, 2024, with an English translation.

International Search Report and Written Opinion of the International Searching Authority issued by the China National Intellectual Property Administration for corresponding International Patent Application No. PCT/CN2019/116345, mailed on Jun. 2, 2020, with an English translation.

International Search Report and Written Opinion of the International Searching Authority issued by the China National Intellectual Property Administration for corresponding International Patent Application No. PCT/CN2019/109230, mailed on Jun. 30, 2020, with a partial English translation.

Intel Corporation, "Scheduling request design for NR", Agenda Item: 7.1.4.2, 3GPP TSG-RAN WG1 Meeting #87, R1-1611998, Reno, USA, Nov. 14-18, 2016.

* cited by examiner

METHODS AND APPARATUSES FOR TRANSMITTING AND RECEIVING UPLINK SIGNAL

CROSS-REFERENCE TO RELATED APPLICATION

This application is a continuation application of International Patent Application PCT/CN2019/116345 filed on Nov. 7, 2019, which claims priority of International Patent Application PCT/CN2019/109230 filed on Sep. 29, 2019, the entire contents of which are incorporated herein by reference.

TECHNICAL FIELD

The embodiments of the present disclosure relate to the field of communication technologies.

BACKGROUND

In recent years, with the rapid growth of various data applications and services based on mobile communication networks, terminal equipments served by the mobile communication networks have also expanded from traditional human-based smartphone terminals to more machine-based terminals of other types. In order to be adapted to such a changing trend, future mobile communication networks should provide more flexible and diverse services to meet demands of different terminal equipments and services.

In addition to the traditional enhanced mobile broadband (eMBB) services, a fifth-generation (5G) mobile communication system also supports massive machine type communications (mMTC) services and ultra-reliable and low-latency communications (URLLC) services.

A URLLC service has some key indicators. For example, for the URLLC service, a target of user plane delay should be 0.5 ms for uplink and 0.5 ms for downlink. An overall URLLC reliability requirement for one time of transmission of a packet is an error rate of $1*10^{-5}$ for 32 bytes and has user plane delay of 1 ms.

It is a common example that a terminal equipment performs both a URLLC service and an eMBB service. For example, the terminal equipment performs a file download service (eMBB service) and a real-time online game (URLLC service) at the same time. Since the URLLC service has a very high requirement for latency, if an eMBB service signal is transmitted when a signal related to the URLLC service is to be transmitted, in order to meet the requirement for latency of the URLLC service, it is often unable to transmit the signal related to the URLLC service after the eMBB service signal has been transmitted.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

However, it was found by the inventors that in a case where an uplink (or information) carrying for example an eMBB service and an uplink (or information) carrying for example a URLLC service collide, a demand for signal transmission in some scenarios is unable to be satisfied.

Addressed to at least one of the above problems, embodiments of this disclosure provide methods and apparatuses for transmitting and receiving an uplink signal.

According to an aspect of the embodiments of this disclosure, there is provided a method for transmitting an uplink signal, including:
 from a media access control layer, instructing a physical layer by a terminal equipment to transmit a first uplink signal on a first time-frequency resource;
 in the media access control layer, determining by the terminal equipment that a second time-frequency resource at least partially overlaps the first time-frequency resource in a time domain or a time-frequency domain; and
 in the media access control layer, comparing first information related to the first uplink signal and second information related to the second time-frequency resource by the terminal equipment.

According to another aspect of the embodiments of this disclosure, there is provided an apparatus for transmitting an uplink signal, including:
 an instructing unit configured to, from a media access control layer, instruct a physical layer to transmit a first uplink signal on a first time-frequency resource;
 a determining unit configured to, in the media access control layer, determine that a second time-frequency resource at least partially overlaps the first time-frequency resource in a time domain or a time-frequency domain; and
 a comparing unit configured to, in the media access control layer, compare first information related to the first uplink signal and second information related to the second time-frequency resource.

According to a further aspect of the embodiments of this disclosure, there is provided a method for transmitting an uplink signal, including:
 in a media access control layer, determining by a terminal equipment that a first time-frequency resource at least partially overlaps a second time-frequency resource in a time domain or a time-frequency domain;
 in the media access control layer, comparing first information related to the first time-frequency resource and second information related to the second time-frequency resource by the terminal equipment; and
 from the media access control layer, instructing a physical layer by the terminal equipment to transmit a first uplink signal related to the first information on the first time-frequency resource and/or transmit a second uplink signal related to the second information on the second time-frequency resource, or instructing a physical layer to transmit a third uplink signal related to the first information and the second information on the first time-frequency resource or the second time-frequency resource.

According to still another aspect of the embodiments of this disclosure, there is provided an apparatus for transmitting an uplink signal, including:
 a determining unit configured to, in a media access control layer, determine that a first time-frequency resource at least partially overlaps a second time-frequency resource in a time domain or a time-frequency domain;
 a comparing unit configured to, in the media access control layer, compare first information related to the first time-frequency resource and second information related to the second time-frequency resource; and
 an instructing unit configured to, from the media access control layer, instruct a physical layer to transmit a first uplink signal related to the first information on the first time-frequency resource and/or transmit a second uplink signal related to the second information on the second time-frequency resource, or instruct a physical layer to transmit a third uplink signal related to the first information and the second information on the first time-frequency resource or the second time-frequency resource.

According to yet another aspect of the embodiments of this disclosure, there is provided a method for receiving an uplink signal, including:

transmitting configuration information or indication information by a network device to a terminal equipment, the configuration information or the indication information being at least used by the terminal equipment to compare first information related to a first uplink signal with second information related to a second time-frequency resource, or compare first information related to a first time-frequency resource with second information related to a second time-frequency resource; and receiving, by the network device, the first uplink signal and/or a second uplink signal related to the second information, or a third uplink signal related to the first information and the second information, transmitted by the terminal equipment.

According to yet still another aspect of the embodiments of this disclosure, there is provided an apparatus for receiving an uplink signal, including:

a transmitting unit configured to transmit configuration information or indication information to a terminal equipment, the configuration information or the indication information being at least used by the terminal equipment to compare first information related to a first uplink signal with second information related to a second time-frequency resource, or compare first information related to a first time-frequency resource with second information related to a second time-frequency resource; and a receiving unit configured to receive the first uplink signal and/or a second uplink signal related to the second information, or a third uplink signal related to the first information and the second information, transmitted by the terminal equipment.

An advantage of the embodiments of this disclosure exists in that the media access control (MAC) layer of the terminal equipment compares the first information related to the first uplink signal and the second information related to the second time-frequency resource, or compares the first information related to the first time-frequency resource and the second information related to the second time-frequency resource, thereby eliminating conflicts between signals carrying or indicating different services, and helping to meet requirements of services for latency.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiments.

DETAILED DESCRIPTION

Figure 1:
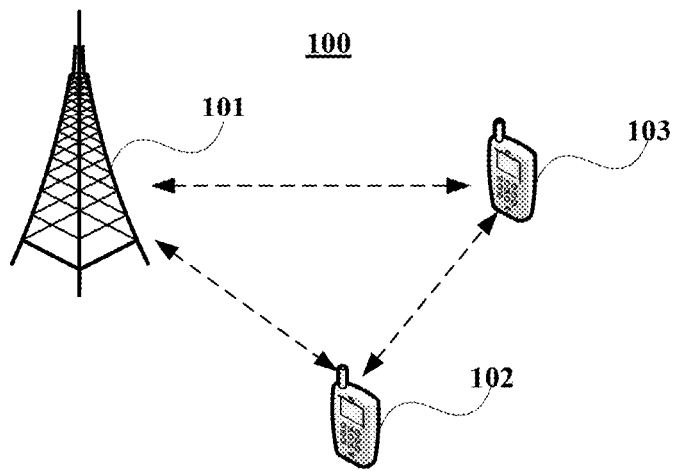
FIG. 1 is schematic diagram of a communication system of an embodiment of this disclosure.

These and further aspects and features of this disclosure will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communication network" or "wireless communication network" may refer to a network satisfying any one of the following communication standards: long term evolution (LTE), long term evolution-advanced (LTE-A), wideband code division multiple access (WCDMA), and high-speed packet access (HSPA), etc.

And communication between devices in a communication system may be performed according to communication protocols at any stage, which may, for example, include but not limited to the following communication protocols: 1G (generation), 2G, 2.5G, 2.75G, 3G, 4G, 4.5G, and 5G and new radio (NR) in the future, etc., and/or other communication protocols that are currently known or will be developed in the future.

In the embodiments of this disclosure, the term "network device", for example, refers to an equipment in a communication system that accesses a terminal equipment to the communication network and provides services for the terminal equipment. The network device may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB). Furthermore, it may include a remote radio head (RRH), a remote radio unit (RRU), a relay, or a low-power node (such as a femto, and a pico). The term "base station" may include some or all of its functions, and each base station may provide communication coverage for a specific geographical area. And a term "cell" may refer to a base station and/or its coverage area, which may be expressed as a serving cell, and may be a macro cell or a pico cell, depending on a context of the term.

In the embodiments of this disclosure, the term "user equipment (UE)" or "terminal equipment (TE) or terminal equipment" refers to, for example, equipment accessing to a communication network and receiving network services via a network device. The terminal equipment may be fixed or mobile, and may also be referred to as a mobile station (MS), a terminal, a subscriber station (SS), an access terminal (AT), or a station, etc.

The terminal equipment may include but not limited to the following devices: a cellular phone, a personal digital assistant (PDA), a wireless modem, a wireless communication device, a hand-held device, a machine-type communication device, a lap-top, a cordless telephone, a smart cell phone, a smart watch, and a digital camera.

For another example, in a scenario of the Internet of Things (IoT), etc., the user equipment may also be a machine or a device performing monitoring or measurement. For example, it may include but not limited to a machine-type communication (MTC) terminal, a vehicle mounted communication terminal, a device to device (D2D) terminal, and a machine to machine (M2M) terminal.

Moreover, the term "network side" or "network device side" refers to a side of a network, which may be a base station, and may include one or more network devices described above. The term "user side" or "terminal side" or "terminal equipment side" refers to a side of a user or a terminal, which may be a UE, and may include one or more terminal equipments described above.

Scenarios in the embodiments of this disclosure shall be described below by way of examples, in which transmission of uplink services shall be described; however, this disclosure is not limited thereto, and it may also be transmission of services on a sidelink.

FIG. 1 is a schematic diagram of a communication system of an embodiment of this disclosure, in which a case where terminal equipments and a network device are taken as examples is schematically shown. As shown in FIG. 1, a communication system 100 may include a network device 101 and terminal equipments 102, 103. For the sake of simplicity, an example having only two terminal equipments and one network device is schematically given in FIG. 1; however, the embodiment of this disclosure is not limited thereto.

In the embodiment of this disclosure, existing services or services that may be implemented in the future may be performed between the network device 101 and the terminal equipments 102, 103. For example, such services may include but not limited to an enhanced mobile broadband (eMBB), massive machine type communication (MTC), and ultra-reliable and low-latency communication (URLLC).

In uplink transmission of Rel-15, when a transmission occasion of an uplink scheduling request (SR) overlaps with a resource of an uplink shared channel (UL-SCH), an MAC layer of a terminal equipment does not transmit the SR. And when a PUSCH resource (e.g. duration) of an uplink configured grant overlaps with a PUSCH resource (e.g. duration) of an uplink grant in dynamic scheduling or RAR, data will not be transmitted according to the configured grant. Currently, there is no distinction as to what kind of service an uplink transmission is related to, for example, a URLLC service or an eMBB service to which it is related.

In addition, only resolution for conflict between a URLLC downlink data channel and an eMBB downlink data channel is standardized in Rel-15, and how to handle conflicts between URLLC services and other transmissions related to eMBB services is under discussion in the standardization of Rel-16. Here, the other transmissions include transmission in an uplink data channel, transmission in an uplink control channel, transmission of uplink control information, and the like.

In the following description, the terms "uplink control signal" and "uplink control information (UCI)" or "physical uplink control channel (PUCCH)" may be interchangeable, without causing confusion, and the terms "uplink data signal" and "uplink data information" or "physical uplink shared channel (PUSCH)" may be interchangeable.

The terms "downlink control signal" and "downlink control information (DCI)" or "physical downlink control channel (PDCCH)" may be interchangeable, and the terms "downlink data signal" and "downlink data information" or "physical downlink shared channel (PDSCH)" may be interchangeable.

In addition, transmitting or receiving a PUSCH may be understood as transmitting or receiving uplink data carried by the PUSCH, and transmitting or receiving a PUCCH may be understood as transmitting or receiving uplink information carried by the PUCCH; uplink signals may include uplink data signals and/or uplink control signals and/or uplink reference signal, etc., which may also be referred to as uplink transmissions or uplink channels; and contents carried or indicated by a signal or a channel may also be referred to as services. In addition, the term "transmitting a signal on a resource" may be understood as "transmitting a signal on a resource" or "transmitting a signal in a resource", and may also be understood as "transmitting a signal by using a resource" or "transmitting a signal according to a resource".

Embodiments of a First Aspect

Figure 2:
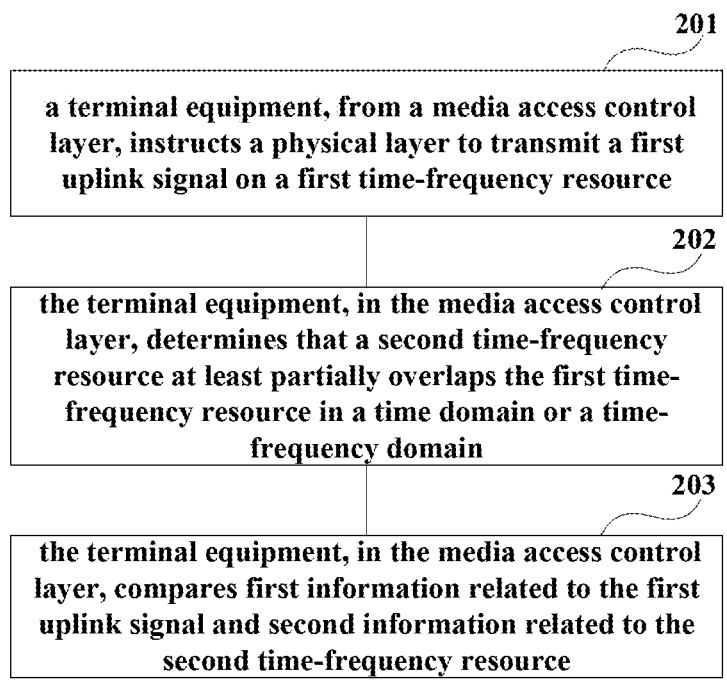
FIG. 2 is a schematic diagram of the method for transmitting an uplink signal of an embodiment of this disclosure.

The embodiments of this disclosure provide a method for transmitting an uplink signal, which shall be described from a terminal equipment side. FIG. 2 is a schematic diagram of the method for transmitting an uplink signal of the embodiment of this disclosure. As shown in FIG. 2, the method includes:
- 201: from a media access control layer, a terminal equipment instructs a physical layer to transmit a first uplink signal on a first time-frequency resource;
- 202: in the media access control layer, the terminal equipment determines that a second time-frequency resource at least partially overlaps the first time-frequency resource in a time domain or a time-frequency domain; and
- 203: in the media access control layer, the terminal equipment compares first information related to the first uplink signal and second information related to the second time-frequency resource.

In an embodiment of this disclosure, the MAC layer has instructed the physical layer to transmit the first uplink signal at the first time-frequency resource, or the MAC layer has assembled (or obtained) the MAC PDU, compares the first information and the second information when the second information occurs and the second time-frequency resource to which the second information corresponds conflicts with the first time-frequency resource, and determines whether to instruct the physical layer to transmit the second uplink signal related to the second information according to a comparison result. The conflict may be that the second time-frequency resource and the first time-frequency resource at least partially overlap in the time domain or in the time-frequency domain.

It should be noted that FIG. 2 only schematically illustrates the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 2.

In some embodiments, the first uplink signal or the second uplink signal includes at least one of the following: a physical random access channel (PRACH), a physical uplink control channel (PUCCH), or a physical uplink shared channel (PUSCH); however, this disclosure is not limited thereto.

In some embodiments, the first information or the second information includes at least one of the following: a random access preamble, a scheduling request (SR), a medium access control (MAC) protocol data unit (PDU), data in a logical channel, an uplink shared channel (UL-SCH) resource, or channel state information (CSI); however, this disclosure is not limited thereto.

In some embodiments, the first time-frequency resource or the second time-frequency resource includes at least one of the following: time and/or frequency resources for a physical random access channel (PRACH), time and/or frequency resources for a physical uplink control channel (PUCCH), or time and/or frequency resources for a physical uplink shared channel (PUSCH), etc.

For example, the first information is a random access preamble, the first uplink signal may be a PRACH carrying the preamble, and the first time-frequency resource may be a time-frequency resource of the PRACH; the first information is an SR, the first uplink signal may be a PUCCH or PUSCH carrying the SR, and the first time-frequency resource may be a time-frequency resource of the PUCCH or a time-frequency resource of the PUSCH; the first information may be an MAC PDU or data in a logical channel or a UL-SCH resource, the first uplink signal may be a PUSCH carrying the MAC PDU or the data in the logical channel or the UL-SCH resource, and the first time-frequency resource may be a time-frequency resource of the PUSCH; the first information is CSI, such as a CSI report, the first uplink signal may be a PUSCH carrying the CSI report, MAC layer data to which the PUSCH corresponds being padding bits, and the first time-frequency resource may be a time-frequency resource of the PUSCH.

The above description is given by taking the first information, the first uplink signal and the first time-frequency resource as examples, and reference may be made to the description of the first information, the first uplink signal and the first time-frequency resource for the second information, the second uplink signal and the second time-frequency resource, which shall not be repeated herein any further.

Taking that the second information is an MAC PDU or data in a logical channel or a UL-SCH resource or CSI as an example, when the terminal equipment performs the comparison, the MAC PDU to which the second information corresponds may have been generated, or the MAC PDU to which the second information corresponds may have not been generated yet. A specific structure or form of the second information is not limited in this disclosure. Here, the generation may also be assembling or obtaining, or may be triggering retransmission or generating retransmission or instructing the physical layer to retransmit a transport block (TB), which is not limited in this disclosure.

In some embodiments, presence of the second information in the MAC layer may include the following situation: that the MAC layer receives or has or is configured with an uplink grant (UL grant), and generates an MAC PDU or is to generate an MAC PDU according to the UL grant.

In some embodiments, the presence of the second information in the MAC layer may include the following situation: that the MAC layer triggers the SR, for example, the MAC layer triggers the SR due to that a buffer status report (BSR) being triggered.

In some embodiments, the presence of the second information in the MAC layer may include the following situation: that a random access preamble is to be transmitted because that a specific condition or event initiates a random access procedure in the MAC layer.

In some embodiments, after the comparison is performed, the terminal equipment at least instructs, from the MAC layer, the physical layer to transmit the second uplink signal related to the second information on the second time-frequency resource. In this text, that "the terminal equipment instructs, from the MAC layer, the physical layer . . . " may be understood as that "the MAC layer of the terminal equipment instructs the physical layer . . . "; that "the terminal equipment transmits in the physical layer . . . " may be understood as that "the physical layer of the terminal equipment transmits . . . "; and that "the terminal equipment determines in the MAC layer . . . " may be understood as that "the MAC layer of the terminal equipment determines . . . ". The MAC layer of the terminal equipment may be one or more than one MAC entities, and may also be an MAC logic function.

Taking that the second information is an MAC PDU or data in a logical channel or a UL-SCH or CSI in the comparison process as an example, for example, after the comparison, the second information is prior to the first information (a preferential order or contents of the priorities shall be described later). In this case, if the MAC PDU to which the second information corresponds has not been generated, the MAC layer of the terminal equipment continues to generate an MAC PDU, and instructs the physical layer to transmit the second uplink signal on the second time-frequency resource; and if the MAC PDU to which the second information corresponds has been generated, the MAC layer of the terminal equipment instructs the physical layer to transmit the second uplink signal on the second time-frequency resource.

In some embodiments, the physical layer of the terminal equipment transmits the second uplink signal on the second time-frequency resource.

In some embodiments, after the comparison is performed, the terminal equipment does not instruct, from the MAC layer, the physical layer to transmit the second uplink signal related to the second information on the second time-frequency resource.

For example, after the comparison, the first information is prior to the second information, and the MAC layer may not instruct the physical layer to transmit the second uplink signal related to the second information on the second time-frequency resource. In this case, the MAC layer may store the second information in a logical channel or in a hybrid automatic repeat request (HARD) buffer, or discard the second information, which is not limited in this disclosure.

In some embodiments, the physical layer of the terminal equipment transmits the first uplink signal on the first time-frequency resource.

In some embodiments, in the MAC layer, the terminal equipment indicates information on the second uplink signal or the second information or a priority of the second time-frequency resource to the physical layer.

For example, a value of the priority of the second information may be indicated, such as a negative integer, 0, or a positive integer.

For another example, it may be indicated that the second information is prior to the first information or it may be indicated that the second information may preempt transmission of the first information or the first uplink signal, etc., such as indicating by a 1-bit flag. For example, when the flag appears or when a value of the flag is 1, it is indicated that the second information is prior to the first information or the first uplink signal, and when the flag does not appear or when a value of the flag is 0, it is indicated that the second information is not prior to the first information or the first uplink signal.

For a further example, it may be indicated whether the second information includes padding bits only, such as indicating whether the UL-SCH contains padding bits of the MAC layer only. When a communication standard may predefine that padding bits are contained, the priority of the second information is relatively low.

A priority of the second time-frequency resource (which may be referred to as a third priority) may be determined by the MAC layer according to information carried or to be carried by the time-frequency resource; for example, a value of the priority of the second time-frequency resource, or whether the second time-frequency resource is prior to the first time-frequency resource, is determined according to the second information carried or to be carried by the second time-frequency resource; that is, the priority of the time-frequency resource here is determined by the MAC layer, and then notified by the MAC layer to the physical layer.

The above comparison process is described by taking the priorities or the preferential order as an example; however, this disclosure is not limited thereto, and the priorities or the preferential order may also not be used in the comparison process.

Figure 3:
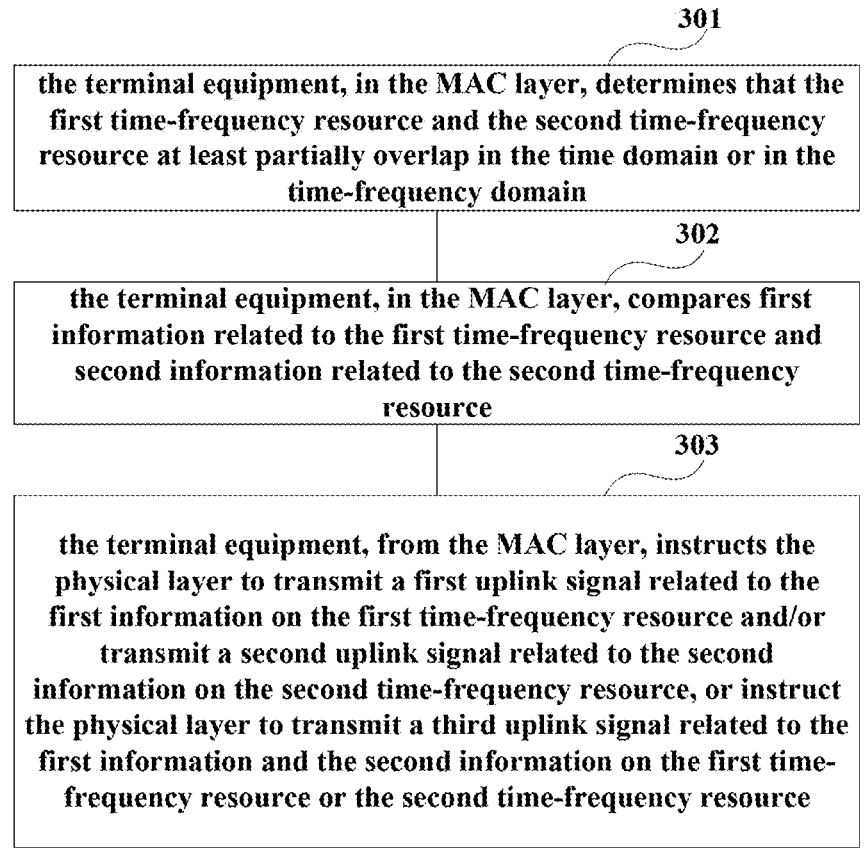
FIG. 3 is another schematic diagram of the method for transmitting an uplink signal of the embodiment of this disclosure.

FIG. 3 is another schematic diagram of the method for transmitting an uplink signal of the embodiment of this disclosure. As shown in FIG. 3, the method includes:

301: the terminal equipment determines, in the MAC layer, that the first time-frequency resource and the second time-frequency resource at least partially overlap in the time domain or in the time-frequency domain;

302: the terminal equipment compares, in the MAC layer, first information related to the first time-frequency resource and second information related to the second time-frequency resource; and 303: the terminal equipment instructs, from the MAC layer, the physical layer to transmit a first uplink signal related to the first information on the first time-frequency resource and/or transmit a second uplink signal related to the second information on the second time-frequency resource, or instruct the physical layer to transmit a third uplink signal related to the first information and the second information on the first time-frequency resource or the second time-frequency resource.

In an embodiment of this disclosure, when the first information and the second information (an MAC PDU may be or may not be generated) appear in the MAC layer and the corresponding first time-frequency resource and the second time-frequency resource conflict, the first information and the second information are compared, and whether the first uplink signal related to the first information or the second uplink signal related to the second information is transmitted, or whether the third uplink signal related to the first information and the second uplink signal is transmitted, is determined according to a result of comparison. The second information is related to the third upstream signal. The conflict may be that the first time-frequency resource and the second time-frequency resource at least partially overlap in the time domain or in the time-frequency domain.

It should be noted that FIG. 3 only schematically illustrates the embodiment of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 3.

Taking that the second information is an MAC PDU or data in a logical channel or a UL-SCH resource or CSI as an example, in performing the comparison, the terminal equipment may or may not have generated the MAC PDU to which the first information or the second information corresponds, and a specific structure or form of the first information or the second information is not limited in this disclosure. Here, the generation may also be assembling or obtaining, or may be triggering retransmission or generating retransmission or instructing the physical layer to retransmit a transport block (TB), which is not limited in this disclosure.

In some embodiments, the presence of the first information and/or the second information in the MAC layer may include the following situation: that the MAC layer receives or has or is configured with an uplink grant (UL grant), and generates or is to generate an MAC PDU according to the UL grant.

In some embodiments, the occurrence of the first information and/or the second information in the MAC layer may include the following situation: that an SR is triggered in the MAC layer, for example, the SR is triggered in a buffer status report (BSR) of the MAC layer.

In some embodiments, the presence of the first information and/or the second information in the MAC layer may include the following situation: a random access preamble to be transmitted because that a specific condition or event initiates a random access procedure in the MAC layer.

In some embodiments, the terminal equipment performs comparison in the MAC layer. Taking that priorities or a preferential order are/is used in the process of comparison as an example, if a priority of the first information is relatively high (a preferential order or contents of the priorities shall be described later), the terminal equipment at least instructs, from the MAC layer, the physical layer to transmit the first uplink signal related to the first information on the first time-frequency resource, and the physical layer of the terminal equipment transmits the first uplink signal on the first time-frequency resource; and if the priority of the second information is relatively high, the terminal equipment at least instructs, from the MAC layer, the physical layer to transmit the second uplink signal related to the second information on the second time-frequency resource, and the physical layer of the terminal equipment transmits the second uplink signal on the second time-frequency resource.

In some embodiments, the terminal equipment indicates, from the MAC layer, the first information and/or the first uplink signal and/or the first time-frequency resource to the physical layer, and indicates, from the MAC layer, the second information and/or the second uplink signal and/or the second time-frequency resource to the physical layer.

In some embodiments, the physical layer of the terminal equipment may combine the first information and the second information and then transmit them, such as in a multiplexing manner, and use the first time-frequency resource or the second time-frequency resource to transmit the third uplink signal in which the first information and the second information are combined.

In some embodiments, the physical layer of the terminal equipment may piggyback the first information in the second time-frequency resource, for example, the SR (first information) may be piggybacked in a PUSCH resource (the second time-frequency resource), and is transmitted together with data carried on the PUSCH resource and/or other uplink control information (the second information).

In some embodiments, the MAC layer of the terminal equipment indicates information on the priority of the first uplink signal or the first information or the first time-frequency resource, and/or information on the priority of the second uplink signal or the second information or the second time-frequency resource, to the physical layer.

For example, it may indicate that the priority of the first information is 6, and that the priority of the second information is −2, wherein the lower a value, the higher the priority; for another example, it may indicate whether the second information is prior to the first uplink signal, or indicate whether the second information may preempt transmission of the first uplink signal, etc., such as indicating by using 1 bit; when the bit is 0, it means that the first information is prior, and when the bit is 1, it means that the second information is prior; for another example, it may indicate whether the MAC PDU or the UL-SCH resource contains only padding bits, a priority of the MAC PDU or the UL-SCH resource containing only the padding is relatively low.

The priority of the first time-frequency resource and/or the second time-frequency resource (which may be referred to as a third priority) may be determined by the MAC layer according to information carried or to be carried by the first time-frequency resource and/or the second time-frequency resource, such as determining whether a value of the priority or the second time-frequency resource is prior to the first time-frequency resource; that is, the priority of the time-frequency resource here is determined by the MAC layer, and then notified by the MAC layer to the physical layer.

Figure 4:
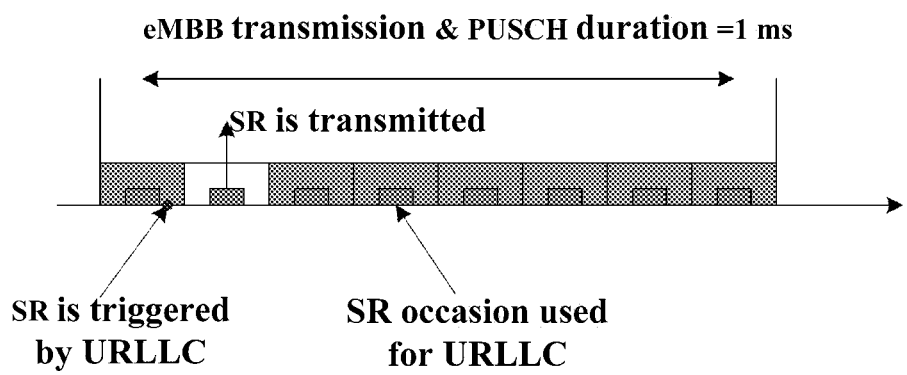
FIG. 4 is an exemplary diagram of conflict between a first uplink signal and a second uplink signal of an embodiment of this disclosure.

FIG. 4 is an exemplary diagram of conflict between the first uplink signal and the second uplink signal of the embodiment of this disclosure. As shown in FIG. 4, the first uplink signal being a PUSCH carrying an eMBB service and the second uplink signal being a PUSCH carrying an SR are taken as examples, wherein the first information is UL-SCH transmission to which the eMBB service corresponds, and the second information is the SR.

For example, the SR is triggered by the URLLC service, and as a priority of a logical channel to which the URLLC service triggering the SR corresponds is higher than a priority of a logical channel to which an eMBB service in UL-SCH transmission corresponds, that is, the priority of the second information is higher than that of the first information, the SR is transmitted.

The preferential order of the first information and the second information, or the priority of the first information and the priority of the second information shall be described below.

In some embodiments, the preferential order of the first information and the second information is determined according to a medium access control (MAC) protocol data unit (PDU) and/or an uplink shared channel (UL-SCH) resource and/or a logical channel priority and/or a triggering event.

In some embodiments, a first priority of the first information and a second priority of the second information are respectively determined according to a medium access control (MAC) protocol data unit (PDU) and/or an uplink shared channel (UL-SCH) resource and/or a logical channel priority and/or a triggering event, and the first priority of the first information and the second priority of the second information are compared to determine the preferential order of the first information and the second information.

In some embodiments, the first information and the second information are compared according to the medium access control (MAC) protocol data unit (PDU) and/or the uplink shared channel (UL-SCH) resource and/or the logical channel priority and/or the triggering event.

For example, the first information and/or the second information are/is an SR/SRs, and the preferential order or priority/priorities is/are determined according to the priority of the logical channel triggering the SR(s). For example, the priority of the SR in FIG. 4 is equal to the priority of the logical channel to which the URLLC service triggering the SR corresponds.

For another example, the first information and/or the second information are/is a random access preamble/random access preambles, and the preferential order or the priorities is/are determined according to a condition/event triggering a random access procedure. For example, the random access procedure is triggered by events shown in Table 1 below:

TABLE 1

Initial access from RRC_IDLE;
RRC Connection Re-establishment procedure;
Handover;
DL or UL data arrival during RRC_CONNECTED when UL synchronisation status is "non-synchronised";
UL data arrival during RRC_CONNECTED when there are no PUCCH resources for SR available;
SR failure;
Request by RRC upon synchronous reconfiguration;
Transition from RRC_INACTIVE;
To establish time alignment at SCell addition;
Request for Other SI;
Beam failure recovery.

For a further example, at least one of the following manners may further be included for the preferential order or priorities of the random access preambles:
  that priority/priorities of random access preamble(s) of the following conditions/events triggering the random access procedure is/are higher than the priority of the MAC PDU or the uplink shared channel (UL-SCH) resource or the logical channel data, these conditions/events including at least one of the following: initial access from RRC_IDLE, RRC connection re-establishment procedure, handover, request by RRC upon synchronous reconfiguration, transition from RRC_INACTIVE, to establish time alignment at SCell addition, or beam failure recovery, etc.;
  that the priority/priorities of the random access preamble(s) of the following conditions/events triggering the random access procedure is/are priority/priorities of a logical channel/logical channels to which uplink data or downlink data correspond, these conditions/events including at least one of the following: DL or UL data arrival during RRC_CONNECTED when UL synchronisation status is "non-synchronised", or UL data arrival during RRC_CONNECTED when there are no PUCCH resources for SR available, etc.;
  that a priority/priorities of a random access preamble(s) of a condition/event SR failure triggering the random access procedure is/are a priority of a logical channel triggering the SR; or
  that a priority/priorities of a random access preamble(s) of a condition/event request for other SI triggering the random access procedure is/are lower than a priority of an MAC PDU or an uplink shared channel (UL-SCH) resource or a logical channel, or lower than priorities of an MAC PDU and a UL-SCH resource and a logical channel.

In some embodiments, the MAC PDU or UL-SCH resource includes at least one of the following: an MAC CE (control element), data to which a logical channel corresponds (referred to as logical channel data herein), or padding.

In some embodiments, no MAC PDU is generated/assembled/obtained, and a highest priority in priority/priorities of one or more logical channels is taken as the priority of the UL-SCH resource.

In some embodiments, no MAC PDU is generated/assembled/obtained, and a highest priority in priority/priorities of one or more logical channels satisfying a logical channel processing (LCP) mapping restriction(s) of a first time-frequency resource/a second time-frequency resource is taken as the priority of the UL-SCH resource.

In some embodiments, no MAC PDU is generated/assembled/obtained, and a highest priority in priority/priorities of one or more logical channels satisfying an LCP mapping restriction(s) of a first time-frequency resource/a second time-frequency resource and having data to be transmitted is taken as the priority of the UL-SCH resource.

In some embodiments, in a case where the MAC PDU or the UL-SCH resource contains data (and possibly padding) to which the logical channel corresponds but does not contain an MAC CE, a highest priority in priorities of one or more logical channels is taken as a priority of the MAC PDU or the UL-SCH resource.

In some embodiments, in a case where the MAC PDU or the UL-SCH resource contains an MAC CE (and possibly padding) but does not contain data to which the logical channel corresponds, a highest priority in priorities of one or more MAC CEs is taken as a priority of the MAC PDU or the UL-SCH resource.

In some embodiments, in a case where the MAC PDU or the UL-SCH resource contains an MAC CE (and possibly padding) but does not contain data to which the logical channel corresponds, a highest priority in priorities of one or more MAC CEs is configured by a network device, or is determined according to a type of the MAC CE.

For example, a preferential order of different MAC CEs is:
  a C-RNTI MAC CE;
  a configured grant confirmation MAC CE;
  an MAC CE for BSR, with exception of BSR included for padding;
  a single entry PHR MAC CE or multiple entry PHR MAC CEs;
  an MAC CE for recommended bit rate query; and
  an MAC CE for BSR included for padding.

In some embodiments, in a case where the MAC PDU or the UL-SCH resource contains data to which the logical channel corresponds and contains an MAC CE (and possibly padding), a highest priority in priorities of one or more logical channels is taken as a priority of the MAC PDU or the UL-SCH resource.

For example, priorities of all logical channels are higher than priorities of all MAC CEs.

For another example, only a highest priority in the logical channels is taken into account. The highest priority in the logical channels is determined according to priorities in the logical channels.

In some embodiments, in a case where the MAC PDU or the UL-SCH resource contains data to which the logical channel corresponds and contains an MAC CE (and possibly padding), a highest priority in priorities of one or more MAC CEs is taken as a priority of the MAC PDU or the UL-SCH resource.

For example, priorities of all MAC CEs are higher than priorities of all logical channels.

For another example, only the highest priority in the MAC CEs contained in the MAC PDU is taken into account. The highest priority in the MAC CE is determined according to priorities in the MAC CE (for example, a preferential order of the MAC CE is determined according to a priority of resource allocation in an LCP process).

In some embodiments, in a case where the MAC PDU or the UL-SCH resource contains data to which the logical channel corresponds and contains an MAC CE (and possibly padding), a highest priority in priorities of one or more logical channels and one or more MAC CEs is taken as a priority of the MAC PDU or the UL-SCH resource.

In some embodiments, in a case where the MAC PDU or the UL-SCH resource contains data to which the logical channel corresponds and an MAC CE (and possibly padding), a preferential order or priorities is/are determined according to types of the logical channel and the MAC CE.

For example, a preferential order of different MAC CEs and logical channels is:
- a C-RNTI MAC CE or data from a UL-CCCH;
- a configured grant confirmation MAC CE;
- an MAC CE for BSR, with exception of BSR included for padding;
- a single entry PHR MAC CE or multiple entry PHR MAC CEs;
- data from any logical channels except the UL-CCCH;
- an MAC CE for recommended bit rate query; and
- an MAC CE for BSR included for padding.

For another example, a value of a priority of a logical channel may be an integer from 1 to 16, and the smaller the value, the higher the priority; and a value of a priority of an MAC CE higher than a priority of a logical channel (such as a C-RNTI MAC CE, and a configured grant confirmation MAC CE) may be a negative integer or 0, and the smaller the value, the higher the priority.

TABLE 2

| MAC CE or logical channel (LCH) | Priority |
|---|---|
| C-RNTI MAC CE | 1 |
| LCH ID 1 | 2 |
| Configured grant confirmation MAC CE | 3 |
| BSR MAC CE (excluding padding BSR) | 4 |
| LCH ID 2 | 5 |
| ... | ... |

For a configuration structure of the RRC message, an RRC reconfiguration message, for example, may be used. The configuration of priority for the LCH in Table 2 above may be placed in rlc-BearerToAddModList, and the configuration of priority for the MAC CE may be placed in mac-CellGroupConfig. An example may be as shown in tables 3 and 4 below:

TABLE 3

```
RRCReconfiguration-v1530-IEs ::= SEQUENCE {
  masterCellGroup          OCTET STRING (CONTAINING
                           CellGroupConfig)
                           OPTIONAL, -- Need M
  ......
}
```

TABLE 4

CellGroupConfig information element

```
-- ASN1START
-- TAG-CELLGROUPCONFIG-START
-- Configuration of one Cell-Group:
CellGroupConfig ::=                    SEQUENCE {
  cellGroupId                          CellGroupId,
  rlc-BearerToAddModList               SEQUENCE (SIZE(1..maxLC-ID)) OF
RLC-BearerConfig       OPTIONAL,  -- Need N
  rlc-BearerToReleaseList              SEQUENCE (SIZE(1..maxLC-ID)) OF
LogicalChannelIdentity OPTIONAL,  -- Need N
  mac-CellGroupConfig                                   MAC-CellGroupConfig
OPTIONAL,  -- Need M
......
}
```

For example, a priority of the single entry PHR MAC CE or multiple entry PHR MAC CEs is 0, a priority of the MAC CE for BSR, with exception of BSR included for padding is −1, a priority of the configured grant confirmation MAC CE is −2, a priority the C-RNTI MAC CE or the data from the UL-CCCH is −3, a priority of the MAC CE for recommended bit rate query is 17, and a priority of the MAC CE for BSR included for padding is 18.

For another example, if an MAC PDU/UL-SCH resource contain(s) a configured grant confirmation MAC CE and data of a logical channel, priority/priorities of the MAC PDU/UL-SCH resource is/are the priority of the configured grant confirmation MAC CE (such as −2).

In some embodiments, the preferential orders or priorities of the logical channel and MAC CE are predefined, or are configured by the network device.

For example, the priorities of the logical channel and MAC CE are uniformly ordered, which may be configured by the network, such as being configured by the network device via a radio resource control (RRC) message. Table 2 shows an example of the configuration.

In some embodiments, in a case where the MAC PDU or the UL-SCH resource contains data to which the logical channel corresponds and contains an MAC CE (and possibly padding), the data of the logical channel are at least divided into data from a first logical channel and data from a second logical channel, and the preferential order or the priorities are determined according to types of the logical channel and the MAC CE.

In some embodiments, a value of a priority of a logical channel to which the first logical channel corresponds is lower than a first threshold, and a value of a priority of a logical channel to which the second logical channel corresponds is higher than or equal to the first threshold; or, a transmission time length to which the first logical channel corresponds is lower than a second threshold, and a transmission time length to which the second logical channel corresponds is higher than or equal to the second threshold.

For example, the data of the logical channel may be divided into at least two types, such as logical channels of a URLLC service type and logical channels of the eMBB service type. Logical channels with logical channel priorities higher than a specific value may be classified into one category, and logical channels with logical channel priorities lower than the specific value may be classified into another category; or logical channels with max PUSCH durations in LCP restrictions lower than a specific value may be classified into one category, and logical channels with max PUSCH durations in LCP restrictions higher than the specific value may be classified into another category; the specific values may be predefined or configured.

For example, a preferential order or priorities of data from the first logical channel is/are higher than a preferential order or priorities of data from the second logical channel. For example, preferential orders of different MAC CEs and data of different logical channels may be:

a C-RNTI MAC CE or data from a UL-CCCH;
a configured grant confirmation MAC CE;
an MAC CE for BSR, with exception of BSR included for padding;
a single entry PHR MAC CE or multiple entry PHR MAC CEs;
data from a first logical channel other than a UL-CCCH;
data from a second logical channel other than a UL-CCCH;
an MAC CE for recommended bit rate query; and
an MAC CE for BSR included for padding.

For another example, the preferential order or priorities of the data from the first logical channel may be higher than a specific MAC CE, such as higher than the BSR MAC CE and/or the PHR MAC CE, or the preferential order or priorities of the data from the first logical channel may be lower than a specific MAC CE, such as lower than a C-RNTI MAC CE or a configured grant confirmation MAC CE. For example, preferential orders of different MAC CEs and data of different logical channels may be:

a C-RNTI MAC CE or data from a UL-CCCH;
data from the first logical channel other than a UL-CCCH;
a configured grant confirmation MAC CE;
an MAC CE for BSR, with exception of BSR included for padding;
a single entry PHR MAC CE or multiple entry PHR MAC CEs;
data from a second logical channel other than a UL-CCCH;
an MAC CE for recommended bit rate query; and
an MAC CE for BSR included for padding.

In some embodiments, the priority of the specific MAC PDU may be set to be a lowest priority, or a predefined priority, or a configured priority, or a default priority.

For example, if an MAC PDU does not contain logical channel data and does not contain an MAC CE, for example, the MAC PDU is used for a physical layer to transmit an aperiodic CSI report and all logical channels have no data to be transmitted at this moment, the MAC PDU will only contain padding bits. And at this moment, the priority of the MAC PDU may be set to be lowest, such as setting to be 20, or the priority of the MAC PDU may be placed at the end.

Comparison of the first information and the second information shall be described in detail below for various situations.

In some embodiments, both the first information and the second information are SRs. For example, the first information is SR1 and the second information is SR2. If a PUCCH resource to which configuration of SR1 corresponds overlaps with a PUCCH resource to which configuration of SR2 corresponds, at least one of the following implementations may be included:

for example, when a priority of a logical channel triggering SR1 (e.g. a logical channel priority) is higher than or equal to a priority of a logical channel triggering SR2, the physical layer is instructed to transmit SR1 on the PUCCH resource to which SR1 corresponds. For example, a corresponding scheme in the communication standards may be as described in Table 5 below:

TABLE 5

As long as at least one SR is pending, the MAC entity shall for each pending SR:
  1>if the MAC entity has no valid PUCCH resource configured for the pending SR:
    2>initiate a Random Access procedure (see clause 5.1) on the SpCell and cancel the pending SR.
  1>else, for the SR configuration corresponding to the pending SR:
    2>when the MAC entity has an SR transmission occasion on the valid PUCCH resource for SR configured; and
    2>if sr-ProhibitTimer is not running at the time of the SR transmission occasion; and
    2>if the PUCCH resource for the SR transmission occasion does not overlap with a measurement gap; and
    2>if the PUCCH resource for the SR transmission occasion does not overlap with a UL-SCH resource:
    2>if the PUCCH resource for the SR transmission occasion does not overlap with the PUCCH resource for the SR transmission occasion corresponding to another pending SR, and the logical channel triggering the pending SR has higher logical channel priority than the logical channel triggering the another pending SR:
      3>if SR_COUNTER < sr-TransMax:
        4>increment SR_COUNTER by 1;
        4>instruct the physical layer to signal the SR on one valid PUCCH resource for SR;
        4>start the sr-ProhibitTimer.
(omitted)

For another example, the priority of the logical channel triggering SR1 and the priority of the logical channel triggering SR2 may be compared first, and subsequent operations are performed on an SR triggered by a logical channel with a higher priority, such as determining related conditions and/or instructing the physical layer to transmit the SR on a PUCCH resource to which the SR corresponds. For example, a corresponding scheme in the communication standards may be as described in Table 6 below:

TABLE 6

If the PUCCH reources configued for more than one pending SRs are overlapped in time, only the pending SR triggered by the logical channel with the highest logical channel priority is considererd as a pending SR.
As long as at least one SR is pending, the MAC entity shall for each pending SR:
  1>if the MAC entity has no valid PUCCH resource configured for the pending SR:
    2>initiate a Random Access procedure (see clause 5.1) on the SpCell and cancel the pending SR.
  1>else, for the SR configuration corresponding to the pending SR:
    2>when the MAC entity has an SR transmission occasion on the valid PUCCH resource for SR configured; and
    2>if sr-ProhibitTimer is not running at the time of the SR transmission occasion; and
    2>if the PUCCH resource for the SR transmission occasion does not overlap with a measurement gap; and
    2>if the PUCCH resource for the SR transmission occasion does not overlap with a UL-SCH resource:
      3>if SR_COUNTER < sr-TransMax:
        4>increment SR_COUNTER by 1;
        4>instruct the physical layer to signal the SR on one valid PUCCH resource for SR;
        4>start the sr-ProhibitTimer.
(omitted)

For a further example, logical channels triggering the SR may be ordered according to their priorities, and subsequent operations are performed in the SR according to a preferential order, such as determining related conditions and/or instructing the physical layer to transmit the SR on a PUCCH resource to which the SR corresponds. For example, a corresponding scheme in the communication standards may be as described in Table 7 below:

TABLE 7

If the PUCCH reources configued for more than one pending SRs are overlapped in time, these pending SRs are ranked in a decreasing order of logical channel priorities of the logical channels that tigger these pending SRs.
As long as at least one SR is pending, the MAC entity shall for each pending SR in the above order:
  1>if the MAC entity has no valid PUCCH resource configured for
    the pending SR:
    2>initiate a Random Access procedure (see clause 5.1) on the SpCell
    and cancel the pending SR.
  1>else, for the SR configuration corresponding to the pending SR:
    2>when the MAC entity has an SR transmission occasion on the
    valid PUCCH resource for SR configured; and
    2>if sr-ProhibitTimer is not running at the time of the SR
    transmission occasion; and
    2>if the PUCCH resource for the SR transmission occasion does not
    overlap with a measurement gap; and
    2>if the PUCCH resource for the SR transmission occasion does not
    overlap with a UL-SCH resource:
      3>if SR_COUNTER < sr-TransMax:
        4>increment SR_COUNTER by 1;
        4>instruct the physical layer to signal the SR on one valid
          PUCCH resource for SR;
        4>start the sr-ProhibitTimer.
(omitted)

In some embodiments, the first information is an SR, the second information is a preamble (a case is similar thereto where the first information is a preamble and the second information is an SR), and preferential orders or priorities of the random access preamble and the SR may further include at least one of the following manners that:

a priority of a random access preamble of following conditions/events triggering the random access procedure is higher than a priority of an SR, these conditions/events including at least one of the following: initial access from RRC_IDLE, an RRC Connection Re-establishment procedure, handover, a request by RRC upon synchronous reconfiguration, transition from RRC_INACTIVE, to establish time alignment at SCell addition, or beam failure recovery, etc.;

a priority of a random access preamble of following conditions/events triggering the random access procedure is a priority of a logical channel to which uplink data or downlink data correspond, a priority of an SR is a priority of a logical channel triggering the SR, and the priority of the logical channel and the priority of the logical channel triggering the SR are compared, the higher a value of a priority, the lower the priority, these conditions/events including at least one of the following: DL or UL data arrival during RRC_CONNECTED when UL synchronisation status is "non-synchronised", or UL data arrival during RRC_CONNECTED when there are no PUCCH resources for SR available, etc.;

a priority of a random access preamble of following conditions/events SR failure triggering the random access procedure is a priority of a logical channel is a priority of a priority of a logical channel triggering the SR failure, a priority of an SR is a priority of a logical channel triggering the SR, and the priority of the logical channel and the priority of the logical channel triggering the SR are compared, the higher a value of a priority, the lower the priority; or a priority of a random access preamble of following conditions/events Request for Other SI triggering the random access procedure is lower than a priority of an SR.

In some embodiments, the first information is an SR, the second information is an MAC PDU or a UL-SCH resource (a case is similar thereto where the first information is an MAC PDU or a UL-SCH resource and the second information is an SR), a preferential order or a priority of the SR being a priority of a logical channel triggering the SR, and a preferential order or a priority of the MAC PDU or UL-SCH resource being a priority of an MAC CE or logical channel data or padding bits contained therein (reference may be made to the above description). The priority of the logical channel triggering the SR and the priority of the MAC PDU or UL-SCH resource are compared, for example, the higher a value of a priority, the lower the priority.

In some embodiments, the first information is a preamble, and the second information is an MAC PDU (a case is similar thereto where the first information is an MAC PDU and the second information is a preamble), and a preferential order or priorities of the random access preamble, the MAC PDU, the uplink shared channel (UL-SCH) resource and the data of the logical channels may further include at least one of the following manners:

a priority of a random access preamble of following conditions/events triggering the random access procedure is higher than the priority of the MAC PDU or the uplink shared channel (UL-SCH) resource or the data of the logical channel, these conditions/events including at least one of the following: initial access from RRC IDLE, an RRC connection re-establishment procedure, handover, a request by RRC upon synchronous reconfiguration, transition from RRC INACTIVE, to establish time alignment at SCell addition, or beam failure recovery, etc.;

a priority of a random access preamble of following conditions/events triggering the random access procedure is a priority of a logical channel to which uplink data or downlink data correspond, and the priority of the logical channel and the priority of the MAC PDU or uplink shared channel (UL-SCH) resource or logical channel data are compared, the higher a value of a priority, the lower the priority, these conditions/events including at least one of the following: DL or UL data arrival during RRC_CONNECTED when UL synchronisation status is "non-synchronised", or UL data arrival during RRC)CONNECTED when there are no PUCCH resources for SR available, etc.;

a priority of a random access preamble of following conditions/events SR failure triggering the random access procedure is a priority of a logical channel triggering the SR failure, and the priority of the logical channel and the priority of the MAC PDU or the uplink shared channel (UL-SCH) resource or the logical channel data are compared, the higher a value of a priority, the lower the priority; or a priority of a random access preamble of following conditions/events Request for Other SI triggering the random access procedure is lower than a priority of an MAC PDU or an uplink shared channel (UL-SCH) resource or logical channel data.

In some embodiments, both the first information and the second information are MAC PDUs or UL-SCH resources, and preferential orders or priorities of the MAC PDUs or UL-SCH resources are priorities of MAC CEs or logical channel data or padding bits contained therein (reference may be made to the above description). The priorities of the two MAC PDUs or UL-SCH resources are compared, for example, the higher a value of a priority, the lower the priority.

In an embodiment of this disclosure, as the MAC layer does not initiate two random access procedures at the same time, there exists no situation where both the first information and the second information are random access preambles.

In an embodiment of this disclosure, the MAC layer of the terminal equipment may transmit corresponding uplink transmission (such as generating an MAC PDU or not generating an MAC PDU, and instructing the physical layer to generate corresponding uplink transmission) by comparing the first information and the second information, so that uplink control information or uplink data related to high-priority services (such as URLLC services) may be transmitted in time without being discarded, thereby ensuring latency and reliability of the high-priority services.

In an embodiment of this disclosure, the first time-frequency resource and/or the second time-frequency resource may have a fourth priority. The fourth priority here may be a priority indicated via DCI or configured via RRC by the network device and processed in the physical layer. Hence, processing of transmission of high-priority information by the physical layer and the MAC layer is consistent. Time-frequency resources below may refer to the first time-frequency resource and/or the second time-frequency resource, and this disclosure is not limited thereto.

For example, the fourth priority may be a priority of a physical layer, or a priority of a UL grant, or a priority of a time-frequency resource, or a priority of a PUSCH carried or to be carried by the time-frequency resource, or a priority of an SR signal carried or to be carried by the time-frequency resource, or a priority of a PRACH carried or to be carried by the time-frequency resource, or a processing capability of a terminal to which the time-frequency resource corresponds, etc.

For example, when the time-frequency resource carries or is to carry a PUSCH, the fourth priority may be indicated via DCI or configured via RRC signaling by a base station; alternatively, in a case where the fourth priority is indicated by the base station via DCI, the physical layer in the terminal equipment notifies the MAC layer of the fourth priority, and in a case where the fourth priority is configured by the base station via RRC signaling, the RRC layer in the terminal equipment configures the MAC layer with the fourth priority.

Or, when the time-frequency resource carries or is to carry an SR signal, the fourth priority may be configured by the base station via RRC signaling; alternatively, the RRC layer in the terminal equipment may configure the MAC layer with the fourth priority.

Or, when the time-frequency resource carries or is to carry a PRACH, the fourth priority may be configured by the base station via RRC signaling; alternatively, the RRC layer in the terminal equipment may configure the MAC layer with the fourth priority.

In at least one embodiment, a fourth priority of the second time-frequency resource is higher than a fourth priority of the first time-frequency resource, in which case the MAC layer may instruct the physical layer to transmit the second information related to the second time-frequency resource.

In at least one embodiment, the fourth priority of the second time-frequency resource is higher than or equal to (or not lower than) the fourth priority of the first time-frequency resource, in which case the MAC layer may instruct the physical layer to transmit the second information related to the second time-frequency resource.

In at least one embodiment, the fourth priority of the second time-frequency resource is equal to the fourth priority of the first time-frequency resource, in which case the MAC layer may instruct the physical layer to transmit the second information related to the second time-frequency resource.

In at least one embodiment, the fourth priority of the second time-frequency resource is lower than the fourth priority of the first time-frequency resource, in which case the MAC layer may not instruct the physical layer to transmit the second information related to the second time-frequency resource.

In at least one embodiment, the fourth priority of the second time-frequency resource is lower than or equal to (not higher than) the fourth priority of the first time-frequency resource, in which case the MAC layer may not instruct the physical layer to transmit the second information related to the second time-frequency resource.

Therefore, it is helpful for the MAC layer and/or the physical layer to perform different processing according to different fourth priorities, and perform faster and more reliable processing on high-priority services, thereby ensuring QoS of high-priority services.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiments that the MAC layer of the terminal equipment compares the first information related to the first uplink signal and the second information related to the second time-frequency resource, or compares the first information related to the first time-frequency resource and the second information related to the second time-frequency resource, thereby eliminating conflicts between signals carrying or indicating different services, and meeting requirements of specific services for latency.

Embodiments of a Second Aspect

The embodiments of this disclosure provide a method for receiving an uplink signal, which shall be described from a network device side, with contents identical to those in the embodiments of the first aspect being not going to be described herein any further.

Figure 5:
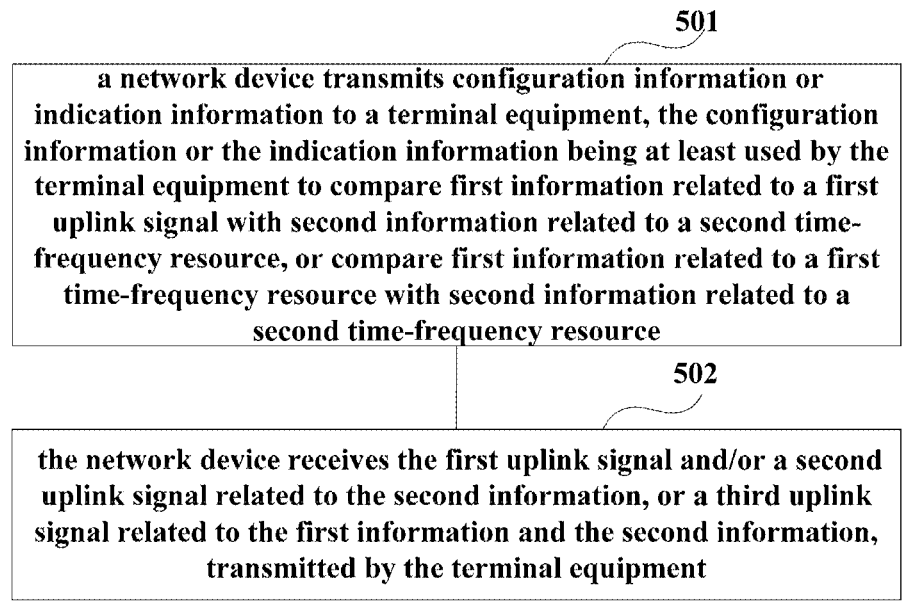
FIG. 5 is a schematic diagram of the method for receiving an uplink signal of an embodiment of this disclosure.

FIG. 5 is a schematic diagram of the method for receiving an uplink signal of an embodiment of this disclosure. As shown in FIG. 5, the method includes:
- 501: a network device transmits configuration information or indication information to a terminal equipment, the configuration information or the indication information being at least used by the terminal equipment to compare first information related to a first uplink signal with second information related to a second time-frequency resource, or compare first information related to a first time-frequency resource with second information related to a second time-frequency resource; and
- 502: the network device receives the first uplink signal and/or a second uplink signal related to the second information, or a third uplink signal related to the first information and the second information, transmitted by the terminal equipment.

It should be noted that FIG. 5 only schematically illustrates the embodiments of this disclosure; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in FIG. 5.

In an embodiment of this disclosure, the first time-frequency resource and/or the second time-frequency resource may have a fourth priority. The fourth priority here may be a priority indicated via DCI or configured via RRC by the network device and processed in the physical layer. Hence, processing of transmission of high-priority information by the physical layer and the MAC layer is consistent. Time-frequency resources below may refer to the first time-frequency resource and/or the second time-frequency resource, and this disclosure is not limited thereto.

For example, the fourth priority may be a priority of a physical layer, or a priority of a UL grant, or a priority of a time-frequency resource, or a priority of a PUSCH carried or to be carried by the time-frequency resource, or a priority of an SR signal carried or to be carried by the time-frequency resource, or a priority of a PRACH carried or to be carried by the time-frequency resource, or a processing capability of a terminal to which the time-frequency resource corresponds, etc.

For example, when the time-frequency resource carries or is to carry a PUSCH, the fourth priority may be indicated via DCI or configured via RRC signaling by a base station; alternatively, in a case where the fourth priority is indicated by the base station via DCI, the physical layer in the terminal equipment notifies the MAC layer of the fourth priority, and in a case where the fourth priority is configured by the base station via RRC signaling, the RRC layer in the terminal equipment configures the MAC layer with the fourth priority.

Or, when the time-frequency resource carries or is to carry an SR signal, the fourth priority may be configured by the base station via RRC signaling; alternatively, the RRC layer in the terminal equipment may configure the MAC layer with the fourth priority.

Or, when the time-frequency resource carries or is to carry a PRACH, the fourth priority may be configured by the base station via RRC signaling; alternatively, the RRC layer in the terminal equipment may configure the MAC layer with the fourth priority.

In at least one embodiment, a fourth priority of the second time-frequency resource is higher than a fourth priority of the first time-frequency resource, in which case the MAC layer may instruct the physical layer to transmit the second information related to the second time-frequency resource.

In at least one embodiment, the fourth priority of the second time-frequency resource is higher than or equal to (or not lower than) the fourth priority of the first time-frequency resource, in which case the MAC layer may instruct the physical layer to transmit the second information related to the second time-frequency resource.

In at least one embodiment, the fourth priority of the second time-frequency resource is equal to the fourth priority of the first time-frequency resource, in which case the MAC layer may instruct the physical layer to transmit the second information related to the second time-frequency resource.

In at least one embodiment, the fourth priority of the second time-frequency resource is lower than the fourth priority of the first time-frequency resource, in which case the MAC layer may not instruct the physical layer to transmit the second information related to the second time-frequency resource.

In at least one embodiment, the fourth priority of the second time-frequency resource is lower than or equal to (not higher than) the fourth priority of the first time-frequency resource, in which case the MAC layer may not instruct the physical layer to transmit the second information related to the second time-frequency resource.

Therefore, it is helpful for the MAC layer and/or the physical layer to perform different processing according to different fourth priorities, and perform faster and more reliable processing on high-priority services, thereby ensuring QoS of high-priority services.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiments that the MAC layer of the terminal equipment compares the first information related to the first uplink signal and the second information related to the second time-frequency resource, or compares the first information related to the first time-frequency resource and the second information related to the second time-frequency resource, thereby eliminating conflicts between signals carrying or indicating different services, and meeting requirements of specific services for latency.

Embodiments of a Third Aspect

The embodiments of this disclosure provide an apparatus for transmitting an uplink signal. The apparatus may be, for example, a terminal equipment, or may be one or more components or assemblies configured in a terminal equipment. Contents in the embodiments identical to those in the embodiments of the first aspect shall not be described herein any further.

Figure 6:
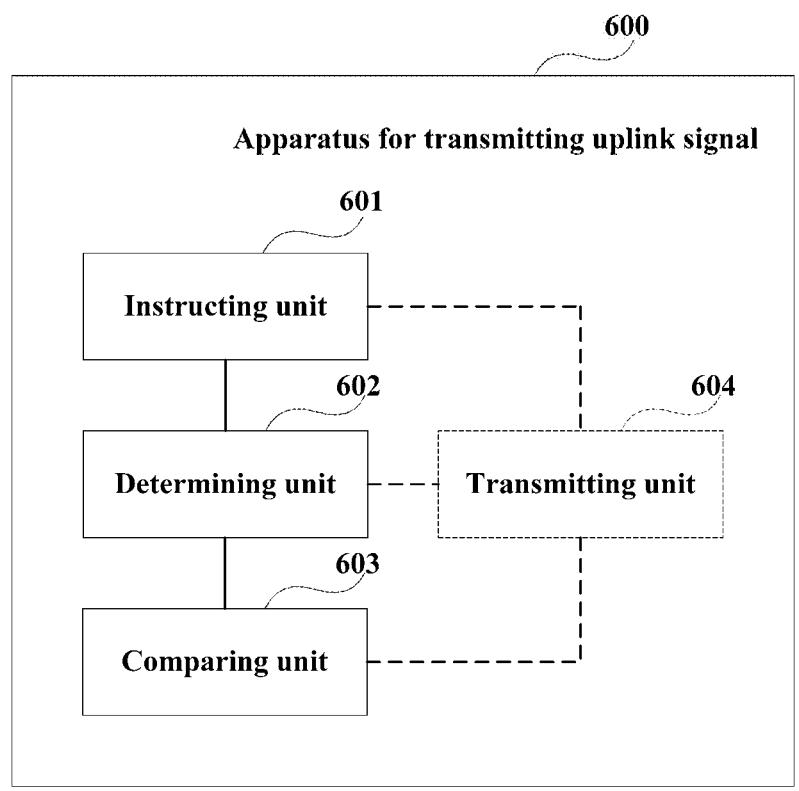
FIG. 6 is a schematic diagram of the apparatus for transmitting an uplink signal of an embodiment of this disclosure.

FIG. 6 is a schematic diagram of the apparatus for transmitting an uplink signal of the embodiment of this disclosure. As shown in FIG. 6, an apparatus 600 for transmitting an uplink signal includes:

an instructing unit 601 configured to, from a media access control layer, instruct a physical layer to transmit a first uplink signal on a first time-frequency resource;

a determining unit 602 configured to, in the media access control layer, determine that a second time-frequency resource at least partially overlaps the first time-frequency resource in a time domain or a time-frequency domain; and a comparing unit 603 configured to, in the media access control layer, compare first information related to the first uplink signal and second information related to the second time-frequency resource.

In some embodiments, the instructing unit 601 is further configured to, from the media access control layer, at least instruct the physical layer to transmit a second uplink signal related to the second information on the second time-frequency resource.

In some embodiments, as shown in FIG. 6, the apparatus 600 for transmitting an uplink signal further includes:

a transmitting unit 604 configured to transmit, in the physical layer, a second uplink signal on the second time-frequency resource, and/or transmit, in the physical layer, the first uplink signal on the first time-frequency resource.

In some embodiments, the instructing unit 601 is further configured to, from the media access control layer, at least instruct the physical layer that information related to a priority of the second information or the second time-frequency resource or a second uplink signal.

Figure 7:
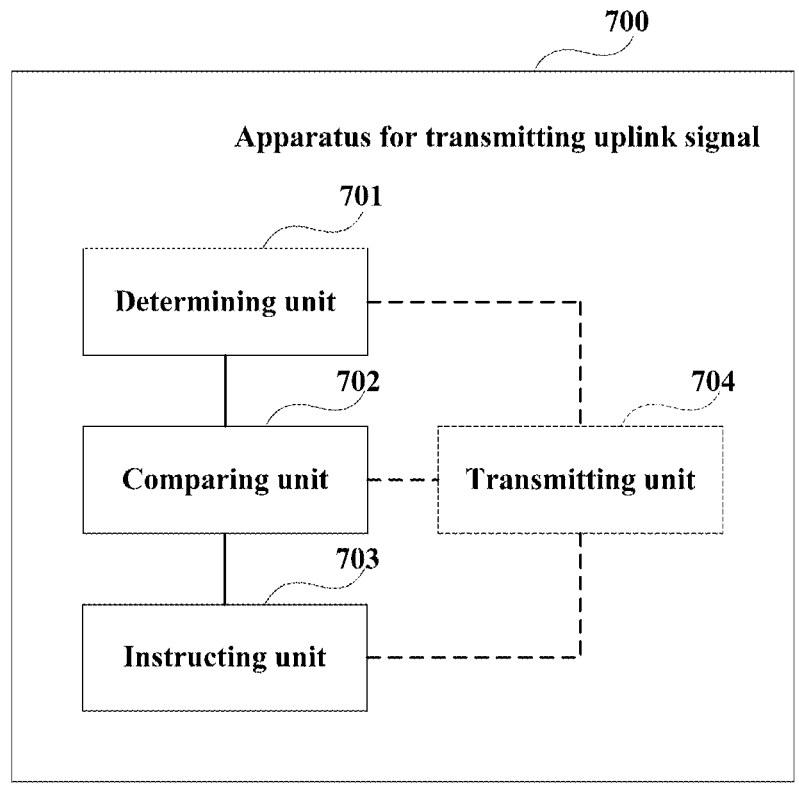
FIG. 7 is another schematic diagram of the apparatus for transmitting an uplink signal of the embodiment of this disclosure.

FIG. 7 is another schematic diagram of the apparatus for transmitting an uplink signal of the embodiment of this disclosure. As shown in FIG. 7, an apparatus 700 for transmitting an uplink signal includes:

a determining unit 701 configured to, on an MAC, determine that a first time-frequency resource at least partially overlaps a second time-frequency resource in a time domain or a time-frequency domain;

a comparing unit 702 configured to, in the MAC layer, compare first information related to the first time-frequency resource and second information related to the second time-frequency resource; and an instructing unit 703 configured to, from the MAC layer, instruct a physical layer to transmit a first uplink signal related to the first information on the first time-frequency resource and/or transmit a second uplink signal related to the second information on the second time-frequency resource, or instruct a physical layer to transmit a third uplink signal related to the first information and the second information on the first time-frequency resource or the second time-frequency resource.

In some embodiments, as shown in FIG. 7, the apparatus 700 for transmitting an uplink signal further includes:

a transmitting unit 704 configured to transmit, in the physical layer, the first uplink signal on the first time-frequency resource and/or transmit, in the physical layer, the second uplink signal on the second time-frequency resource, or transmit a third uplink signal related to the first information and the second information on the first time-frequency resource or the second time-frequency resource.

In some embodiments, the first uplink signal or the second uplink signal includes at least one of a physical random access channel, a physical uplink control channel, or a physical uplink shared channel; and the first information or the second information includes at least one of a random access preamble, a scheduling request, a media access control protocol data unit and/or an uplink shared channel resource, data in a logical channel, or channel state information.

In some embodiments, a preferential order of the first information and the second information is determined according to a media access control protocol data unit and/or an uplink shared channel resource and/or a priority of a logical channel and/or a triggering event.

In some embodiments, a first priority of the first information and a second priority of the second information is respectively determined according to a media access control protocol data unit and/or an uplink shared channel resource and/or a priority of a logical channel and/or a triggering event, and the first priority of the first information and the second priority of the second information are compared to determine the preferential order of the first information and the second information.

In some embodiments, the first information and the second information are compared according to a media access control protocol data unit and/or an uplink shared channel resource and/or a priority of a logical channel and/or a triggering event.

In some embodiments, the media access control protocol data unit or the uplink shared channel resource includes at least one of a media access control control element, data to which a logical channel corresponds, or padding.

In some embodiments, in a case where the media access control protocol data unit or the uplink shared channel resource includes the data to which the logical channel corresponds but does not include the media access control control element, a highest priority in priorities of one or more logical channels is taken as a priority of the media access control protocol data unit or the uplink shared channel resource.

In some embodiments, in a case where the media access control protocol data unit or the uplink shared channel resource includes the media access control control element but does not include the data to which the logical channel corresponds, a highest priority in priorities of one or more media access control control elements is taken as a priority of the media access control protocol data unit or the uplink shared channel resource.

In some embodiments, in a case where the media access control protocol data unit or the uplink shared channel resource includes the media access control control element but does not include the data to which the logical channel corresponds, a highest priority in priorities of one or more media access control control elements is configured by a network device, or is determined according to a type of the media access control control element.

In some embodiments, in a case where the media access control protocol data unit or the uplink shared channel resource includes the data to which the logical channel corresponds and the media access control control element, a highest priority in priorities of one or more logical channels is taken as a priority of the media access control protocol data unit or the uplink shared channel resource, or a highest priority in priorities of one or more media access control control elements is taken as a priority of the media access control protocol data unit or the uplink shared channel resource.

In some embodiments, in a case where the media access control protocol data unit or the uplink shared channel resource includes the data to which the logical channel corresponds and the media access control control element, a highest priority in priorities of one or more logical channels and priorities of one or more media access control control elements is taken as a priority of the media access control protocol data unit or the uplink shared channel resource.

In some embodiments, in a case where the media access control protocol data unit or the uplink shared channel resource includes the data to which the logical channel corresponds and the media access control control element, a preferential order or a priority is determined according to types of the logical channel and the media access control control element.

In some embodiments, preferential orders or priorities of the logical channel and the media access control control element are predefined, or are configured by a network device.

In some embodiments, in a case where the media access control protocol data unit or the uplink shared channel resource includes the data to which the logical channel corresponds and the media access control control element, the data of the logical channel are at least divided into data from a first logical channel and data from a second logical channel, and a preferential order or a priority is determined according to types of the logical channel and the media access control control element.

In some embodiments, a value of a logical channel priority to which the first logical channel corresponds is lower than a first threshold, and a value of a logical channel priority to which the second logical channel corresponds is greater than or equal to the first threshold;
   or, a transmission time length to which the first logical channel corresponds is less than a second threshold, and a transmission time length to which the second logical channel corresponds is greater than or equal to the second threshold.

It should be noted that the components or modules related to this disclosure are only described above. However, this disclosure is not limited thereto, and the apparatus 600 or 700 for transmitting an uplink signal may further include other components or modules, and reference may be made to related techniques for particulars of these components or modules.

Furthermore, for the sake of simplicity, connection relationships between the components or modules or signal profiles thereof are only illustrated in FIGS. 6 and 7. However, it should be understood by those skilled in the art that such related techniques as bus connection, etc., may be adopted. And the above components or modules may be implemented by hardware, such as a processor, a memory, a transmitter, and a receiver, which are not limited in the embodiment of this disclosure.

The above implementations only illustrate the embodiment of this disclosure. However, this disclosure is not limited thereto, and appropriate variants may be made on the basis of these implementations. For example, the above implementations may be executed separately, or one or more of them may be executed in a combined manner.

It can be seen from the above embodiments that the MAC layer of the terminal equipment compares the first information related to the first uplink signal and the second information related to the second time-frequency resource, or compares the first information related to the first time-frequency resource and the second information related to the second time-frequency resource, thereby eliminating conflicts between signals carrying or indicating different services.

Embodiments of a Fourth Aspect

The embodiments of this disclosure provide an apparatus for receiving an uplink signal. The apparatus may be, for example, a network device, or may be one or more components or assemblies configured in a network device. Contents in the embodiments identical to those in the embodiments of the first to fourth aspects shall not be described herein any further.

Figure 8:
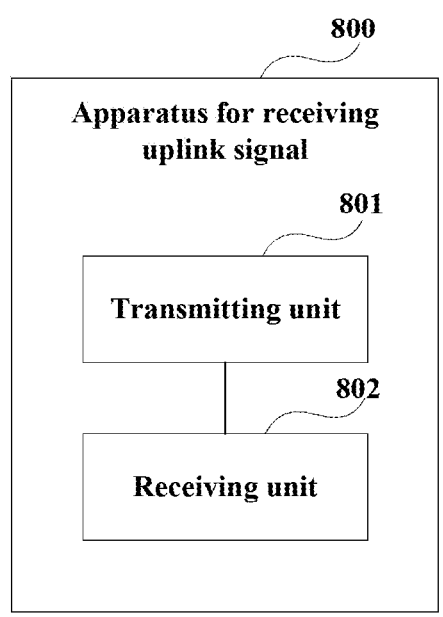
FIG. 8 is a schematic diagram of the apparatus for receiving an uplink signal of an embodiment of this disclosure.

FIG. 8 is a schematic diagram of the apparatus for receiving an uplink signal of the embodiment of this disclosure. As shown in FIG. 8, an apparatus 800 for receiving an uplink signal includes:
   a transmitting unit 801 configured to transmit configuration information or indication information to a terminal equipment, the configuration information or the indication information being at least used by the terminal equipment to compare first information related to a first uplink signal with second information related to a second time-frequency resource, or compare first information related to a first time-frequency resource with second information related to a second time-frequency resource; and
   a receiving unit 802 configured to receive the first uplink signal and/or a second uplink signal related to the second information, or a third uplink signal related to the first information and the second information, transmitted by the terminal equipment.

It should be noted that the components or modules related to this disclosure are only described above. However, this disclosure is not limited thereto, and the apparatus 800 for receiving an uplink signal may further include other components or modules, and reference may be made to related techniques for particulars of these components or modules.

Furthermore, for the sake of simplicity, connection relationships between the components or modules or signal profiles thereof are only illustrated in FIG. 8. However, it should be understood by those skilled in the art that such related techniques as bus connection, etc., may be adopted. And the above components or modules may be implemented by hardware, such as a processor, a memory, a transmitter, and a receiver, etc., which are not limited in the embodiment of this disclosure.

It can be seen from the above embodiments that the MAC layer of the terminal equipment compares the first information related to the first uplink signal and the second information related to the second time-frequency resource, or compares the first information related to the first time-frequency resource and the second information related to the second time-frequency resource, thereby eliminating conflicts between signals carrying or indicating different services.

Embodiments of a Fifth Aspect

The embodiments of this disclosure provide a communication system, and reference may be made to FIG. 1, with contents identical to those in the embodiments of the first to the fourth aspect being not going to be described herein any further.

In some embodiments, the communication system 100 may include:
   a terminal equipment 102 configured to, from a media access control layer, instruct a physical layer to transmit a first uplink signal on a first time-frequency resource, in the media access control layer, determine that a second time-frequency resource at least partially overlaps the first time-frequency resource in a time domain or a time-frequency domain, and in the media access control layer, compare first information related to the first uplink signal and second information related to the second time-frequency resource; and
   a network device 101 configured to receive the first uplink signal and/or second uplink signal related to the second signal.

In some embodiments, the communication system 100 may include:
   a terminal equipment 102 configured to, in a media access control layer, determine that a first time-frequency resource at least partially overlaps a second time-frequency resource in a time domain or a time-frequency domain, in the media access control layer, compare first information related to the first time-frequency resource and second information related to the second time-frequency resource, and from the media access control layer, instruct a physical layer to transmit a first uplink signal related to the first information on the first time-frequency resource and/or transmit a second uplink signal related to the second information on the second time-frequency resource, or instruct a physical layer to transmit a third uplink signal related to the first information and the second information on the first time-frequency resource or the second time-frequency resource; and a network device 101 configured to receive the first uplink signal and/or second uplink signal, or a third uplink signal.

The embodiment of this disclosure further provides a network device, which may be, for example, a base station. However, this disclosure is not limited thereto, and it may also be another network device.

Figure 9:
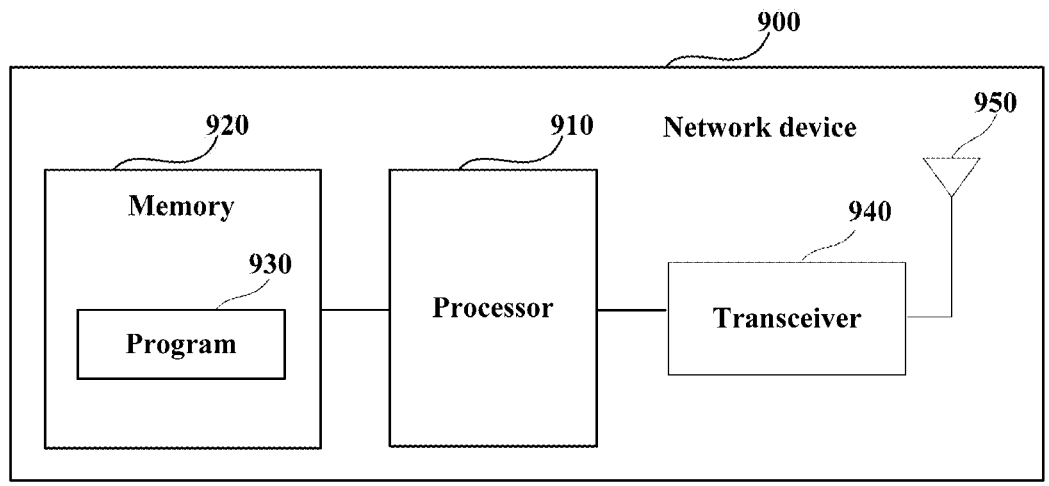
FIG. 9 is a schematic diagram of the network device of an embodiment of this disclosure.

FIG. 9 is a schematic diagram of the network device of the embodiment of this disclosure. As shown in FIG. 9, the network device 900 may include a processor 910 (such as a central processing unit (CPU)) and a memory 920, the memory 920 being coupled to the processor 910. The memory 920 may store various data, and furthermore, it may store a program 930 for data processing, and execute the program 930 under control of the processor 910.

For example, the processor 910 may be configured to execute the program to carry out the method for receiving an uplink signal as described in the embodiment of the second aspect. For example, the processor 910 may be configured to execute the following control: transmitting configuration information or indication information to a terminal equipment, the configuration information or the indication information being at least used by the terminal equipment to compare first information related to a first uplink signal with second information related to a second time-frequency resource, or compare first information related to a first time-frequency resource with second information related to a second time-frequency resource; and receiving the first uplink signal and/or a second uplink signal related to the second information, or a third uplink signal related to the first information and the second information, transmitted by the terminal equipment.

Furthermore, as shown in FIG. 9, the network device 900 may include a transceiver 940, and an antenna 950, etc. Functions of the above components are similar to those in the related art, and shall not be described herein any further. It should be noted that the network device 900 does not necessarily include all the parts shown in FIG. 9, and furthermore, the network device 900 may include parts not shown in FIG. 9, and the related art may be referred to.

The embodiment of this disclosure further provides a terminal equipment; however, this disclosure is not limited thereto, and it may also be another equipment.

Figure 10:
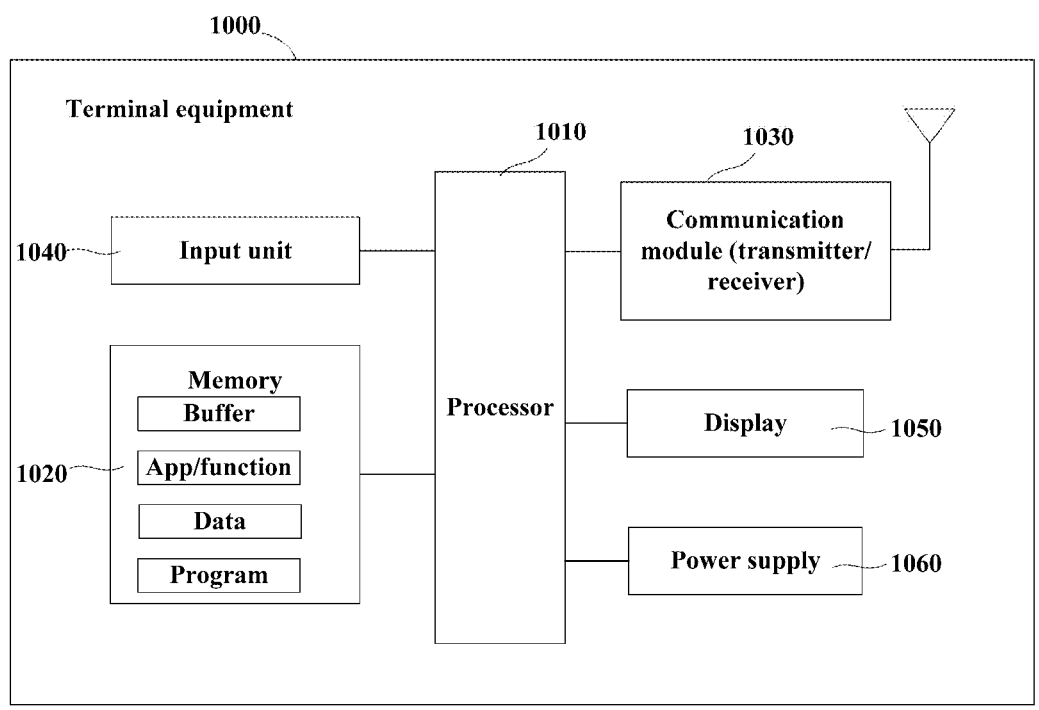
FIG. 10 is a schematic diagram of the terminal equipment of an embodiment of this disclosure.

FIG. 10 is a schematic diagram of the terminal equipment of the embodiment of this disclosure. As shown in FIG. 10, a terminal equipment 1000 may include a processor 1010 and a memory 1020, the memory 1020 storing data and a program and being coupled to the processor 1010. It should be noted that this figure is illustrative only, and other types of structures may also be used, so as to supplement or replace this structure and achieve a telecommunications function or other functions.

For example, the processor 1010 may be configured to execute a program to carry out the method for transmitting an uplink signal as described in the embodiment of the first aspect. For example, the processor 1010 may be configured to perform the following control: from a media access control (MAC) layer, instructing a physical layer (PHY) to transmit a first uplink signal on a first time-frequency resource, in the MAC layer, determining that a second time-frequency resource at least partially overlaps the first time-frequency resource in a time domain or a time-frequency domain, and in the MAC layer, comparing first information related to the first uplink signal and second information related to the second time-frequency resource.

For another example, the processor 1010 may be configured to perform the following control: determining in an MAC layer that a first time-frequency resource at least partially overlaps a second time-frequency resource in a time domain or a time-frequency domain, in the MAC layer, comparing first information related to the first time-frequency resource and second information related to the second time-frequency resource by the terminal equipment, and from the MAC layer, instruct a physical layer to transmit a first uplink signal related to the first information on the first time-frequency resource and/or transmit a second uplink signal related to the second information on the second time-frequency resource, or instruct a physical layer to transmit a third uplink signal related to the first information and the second information on the first time-frequency resource or the second time-frequency resource.

As shown in FIG. 10, the terminal equipment 1000 may further include a communication module 1030, an input unit 1040, a display 1050, and a power supply 1060; wherein functions of the above components are similar to those in the related art, which shall not be described herein any further. It should be noted that the terminal equipment 1000 does not necessarily include all the parts shown in FIG. 10, and the above components are not necessary. Furthermore, the terminal equipment 1000 may include parts not shown in FIG. 10, and the related art may be referred to.

An embodiment of this disclosure provides a computer program, which, when executed in a terminal equipment, will cause the terminal equipment to carry out the method for transmitting an uplink signal as described in the embodiments of the first aspect.

An embodiment of this disclosure provides a storage medium, including a computer program, which, when executed in a terminal equipment, will cause the terminal equipment to carry out the method for transmitting an uplink signal as described in the embodiments of the first aspect.

An embodiment of this disclosure provides a computer program, which, when executed in a network device, will cause the network device to carry out the method for receiving an uplink signal as described in the embodiments of the second aspect.

An embodiment of this disclosure provides a storage medium, including a computer program, which, when executed in a network device, will cause the network device to carry out the method for receiving an uplink signal as described in the embodiments of the second aspect.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or steps as described above. This disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the steps shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the principle of the present invention, and such variants and modifications fall within the scope of the present invention.

As to implementations containing the above embodiments, following supplements are further disclosed.

Supplement 1. A method for transmitting an uplink signal, including:
from a media access control (MAC) layer, instructing a physical layer (PHY) by a terminal equipment to transmit a first uplink signal on a first time-frequency resource;
in the MAC layer, determining by the terminal equipment that a second time-frequency resource at least partially overlaps the first time-frequency resource in a time domain or a time-frequency domain; and
in the MAC layer, comparing first information related to the first uplink signal and second information related to the second time-frequency resource by the terminal equipment.

Supplement 2. The method according to supplement 1, wherein the method further includes:
from the media access control layer, at least instruct the physical layer by the terminal equipment to transmit a second uplink signal related to the second information on the second time-frequency resource.

Supplement 3. The method according to supplement 2, wherein the method further includes:
transmitting, in the physical layer, the second uplink signal by the terminal equipment on the second time-frequency resource.

Supplement 4. The method according to supplement 1, wherein the method further includes:
transmitting, in the physical layer, the first uplink signal by the terminal equipment on the first time-frequency resource.

Supplement 5. The method according to any one of supplements 1-4, wherein the method further includes:
from the MAC layer, indicating information related to a priority of the second information or the second time-frequency resource or a second uplink signal by the terminal equipment to the physical layer.

Supplement 6. The method according to any one of supplements 1-5, wherein the priority of the second time-frequency resource is higher than a priority of the first time-frequency resource.

Supplement 7. The method according to any one of supplements 1-5, wherein the priority of the second time-frequency resource is higher than or equal to a priority of the first time-frequency resource.

Supplement 8. The method according to any one of supplements 1-5, wherein the priority of the second time-frequency resource is equal to a priority of the first time-frequency resource.

Supplement 9. The method according to any one of supplements 1-8, wherein the first uplink signal or the second uplink signal includes at least one of a physical random access channel (PRACH), a physical uplink control channel (PUCCH), a physical uplink shared channel (PUSCH);

Supplement 10. The method according to any one of supplements 1-9, wherein the first information or the second information includes at least one of a random access preamble, a scheduling request (SR), a media access control (MAC) protocol data unit (PDU), data in a logical channel, an uplink shared channel (UL-SCH) resource, or channel state information (CSI).

Supplement 11. The method according to any one of supplements 1-10, wherein a preferential order of the first information and the second information is determined according to the media access control (MAC) protocol data unit (PDU) and/or the uplink shared channel (UL-SCH) resource and/or a priority of a logical channel and/or a triggering event.

Supplement 12. The method according to any one of supplements 1-10, wherein a first priority of the first information and a second priority of the second information is respectively determined according to the media access control (MAC) protocol data unit (PDU) and/or the uplink shared channel (UL-SCH) resource and/or a priority of a logical channel and/or a triggering event;
and the first priority of the first information and the second priority of the second information is compared to determine the preferential order of the first information and the second information.

Supplement 13. The method according to any one of supplements 1-12, wherein the first information and the second information is compared according to the media access control (MAC) protocol data unit (PDU) and/or the uplink shared channel (UL-SCH) resource and/or the priority of the logical channel and/or the triggering event.

Supplement 14. The method according to any one of supplements 10-13, wherein the MAC PDU or the UL-SCH resource includes at least one of an MAC CE (control element), data to which a logical channel corresponds, or padding.

Supplement 15. The method according to any one of supplements 10-14, wherein in a case where the first information and/or the second information is/are an SR/SRs, the preferential order or priority/priorities of the first information and/or the second information is/are determined according to a priority/priorities of a logical channel/logical channels triggering the SR/SRs.

Supplement 16. The method according to any one of supplements 10-14, wherein in a case where the first information and/or the second information is/are a random access preamble/random access preambles, the preferential order or priority/priorities of the first information and/or the second information is/are determined according to a condition/event triggering the random access procedure.

Supplement 17. The method according to supplement 16, wherein priority/priorities of random access preamble(s) of the following conditions/events triggering the random access procedure is/are higher than the priority of the MAC PDU or the uplink shared channel (UL-SCH) resource or the logical channel data, these conditions/events including at least one of the following: initial access from RRC_IDLE, RRC connection re-establishment procedure, handover, request by RRC upon synchronous reconfiguration, transition from RRC_INACTIVE, to establish time alignment at SCell addition, or beam failure recovery.

Supplement 18. The method according to supplement 16, wherein the priority/priorities of the random access preamble(s) of the following conditions/events triggering the random access procedure is/are priority/priorities of a logical channel/logical channels to which uplink data or downlink data correspond, these conditions/events including at least one of the following: DL or UL data arrival during RRC_CONNECTED when UL synchronisation status is "non-synchronised", or UL data arrival during RRC_CONNECTED when there are no PUCCH resources for SR available.

Supplement 19. The method according to supplement 16, wherein a priority/priorities of a random access preamble(s) of a condition/event scheduling request (SR) failure triggering the random access procedure is/are a priority of a logical channel triggering the SR.

Supplement 20. The method according to supplement 16, wherein a priority/priorities of a random access preamble(s) of a condition/event request for other SI triggering the random access procedure is/are lower than a priority of an MAC PDU or an uplink shared channel (UL-SCH) resource or a logical channel, or lower than priorities of an MAC PDU and a UL-SCH resource and a logical channel.

Supplement 21. The method according to any one of supplements 10-14, wherein in a case where no MAC PDU is generated/assembled/obtained, a highest priority in priority/priorities of one or more logical channels is taken as the priority of the UL-SCH resource.

Supplement 22. The method according to any one of supplements 10-14, wherein in a case where no MAC PDU is generated/assembled/obtained, a highest priority in priority/priorities of one or more logical channels satisfying a logical channel processing (LCP) mapping restriction(s) of a first time-frequency resource/a second time-frequency resource is taken as the priority of the UL-SCH resource.

Supplement 23. The method according to any one of supplements 10-14, wherein in a case where no MAC PDU is generated/assembled/obtained, a highest priority in priority/priorities of one or more logical channels satisfying an LCP mapping restriction(s) of a first time-frequency resource/a second time-frequency resource and having data to be transmitted is taken as the priority of the UL-SCH resource.

Supplement 24. The method according to supplement 14, wherein in a case where the MAC PDU or the UL-SCH resource contains data to which the logical channel corresponds but does not contain an MAC CE, a highest priority in priorities of one or more logical channels is taken as a priority of the MAC PDU or the UL-SCH resource.

Supplement 25. The method according to supplement 14, wherein in a case where the MAC PDU or the UL-SCH resource contains an MAC CE but does not contain data to which the logical channel corresponds, a highest priority in priorities of one or more MAC CEs is taken as a priority of the MAC PDU or the UL-SCH resource.

Supplement 26. The method according to supplement 14, wherein in a case where the MAC PDU or the UL-SCH resource contains an MAC CE but does not contain data to which the logical channel corresponds, a highest priority in priorities of one or more MAC CEs is configured by a network device, or is determined according to a type of the MAC CE.

Supplement 27. The method according to supplement 26, wherein a preferential order of different MAC CEs is:
 C-RNTI MAC CE;
 a configured grant confirmation MAC CE;
 an MAC CE for BSR, with exception of BSR included for padding;
 a single entry PHR MAC CE or multiple entry PHR MAC CEs;
 an MAC CE for recommended bit rate query; and
 an MAC CE for BSR included for padding.

Supplement 28. The method according to supplement 14, wherein in a case where the MAC PDU or the UL-SCH resource contains data to which the logical channel corresponds and contains an MAC CE, a highest priority in priorities of one or more logical channels is taken as a priority of the MAC PDU or the UL-SCH resource, or a highest priority in priorities of one or more MAC CEs is taken as a priority of the MAC PDU or the UL-SCH resource.

Supplement 29. The method according to supplement 14, wherein in a case where the MAC PDU or the UL-SCH resource contains data to which the logical channel corresponds and contains an MAC CE, a highest priority in priorities of one or more logical channels and one or more MAC CEs is taken as a priority of the MAC PDU or the UL-SCH resource.

Supplement 30. The method according to supplement 14, wherein in a case where the MAC PDU or the UL-SCH resource contains data to which the logical channel corresponds and contains an MAC CE, a preferential order or priorities is/are determined according to types of the logical channel and the MAC CE.

Supplement 31. The method according to supplement 30, wherein a preferential order of different MAC CEs and logical channels is:
 a C-RNTI MAC CE or data from a UL-CCCH;
 a configured grant confirmation MAC CE;
 an MAC CE for BSR, with exception of BSR included for padding;
 a single entry PHR MAC CE or multiple entry PHR MAC CEs;
 data from any logical channels except the UL-CCCH;
 an MAC CE for recommended bit rate query; and
 an MAC CE for BSR included for padding.

Supplement 32. The method according to supplement 14, wherein a preferential order or priorities of the logical channel and the MAC CE is/are predefined, or configured by the network device.

Supplement 33. The method according to supplement 14, wherein in a case where the MAC PDU or the UL-SCH resource contains data to which the logical channel corresponds and contains an MAC CE, the data of the logical channel are at least divided into data from a first logical channel and data from a second logical channel, and the preferential order or the priorities are determined according to types of the logical channel and the MAC CE.

Supplement 34. The method according to supplement 33, wherein a value of a priority of a logical channel to which the first logical channel corresponds is lower than a first threshold, and a value of a priority of a logical channel to which the second logical channel corresponds is higher than or equal to the first threshold;
  or, a transmission time length to which the first logical channel corresponds is lower than a second threshold, and a transmission time length to which the second logical channel corresponds is higher than or equal to the second threshold.

Supplement 35. The method according to supplement 33 or 34, wherein preferential orders of different MAC CEs and data of different logical channels are:
  a C-RNTI MAC CE or data from a UL-CCCH;
  a configured grant confirmation MAC CE;
  an MAC CE for BSR, with exception of BSR included for padding;
  a single entry PHR MAC CE or multiple entry PHR MAC CEs;
  data from a first logical channel other than a UL-CCCH;
  data from a second logical channel other than a UL-CCCH;
  an MAC CE for recommended bit rate query; and
  an MAC CE for BSR included for padding.

Supplement 36. The method according to supplement 33 or 34, wherein preferential orders of different MAC CEs and data of different logical channels are:
  a C-RNTI MAC CE or data from a UL-CCCH;
  data from the first logical channel other than a UL-CCCH;
  a configured grant confirmation MAC CE;
  an MAC CE for BSR, with exception of BSR included for padding;
  a single entry PHR MAC CE or multiple entry PHR MAC CEs;
  data from a second logical channel other than a UL-CCCH;
  an MAC CE for recommended bit rate query; and
  an MAC CE for BSR included for padding.

Supplement 37. The method according to any one of supplements 1-36, wherein in a case where the first information is SR1 and the second information is SR2, if a PUCCH resource to which configuration of SR1 corresponds overlaps with a PUCCH resource to which configuration of SR2 corresponds,
  when a priority of a logical channel triggering SR1 is higher than or equal to a priority of a logical channel triggering SR2, the MAC layer instructs the physical layer to transmit SR1 on the PUCCH resource to which SR1 corresponds;
  or, the priority of the logical channel triggering SR1 and the priority of the logical channel triggering SR2 are compared, and for an SR triggered by a logical channel with a higher priority, the MAC layer instructs the physical layer to transmit the SR on the PUCCH resource to which the SR corresponds;
  or, priorities of logical channels triggering the SR are ordered, and according to the preferential order, the MAC layer instructs the physical layer to transmit the SR on the PUCCH resource to which the SR corresponds.

Supplement 38. The method according to any one of supplements 1-36, wherein in a case where the first information is a random access preamble and the second information is a scheduling request, or the first information is a scheduling request and the second information is a random access preamble, the preferential order or the priorities is/are determined in at least one of the following manners that:
  the priority of the random access preamble triggering the following condition/event of the random access procedure is higher than the priority of the scheduling request, the condition/event including at least one of the following: initial access from RRC IDLE, RRC connection re-establishment procedure, handover, request by RRC upon synchronous reconfiguration, transition from RRC INACTIVE, to establish time alignment at SCell addition, or beam failure recovery;
  the priority/priorities of the random access preamble(s) of the following conditions/events triggering the random access procedure is/are priority/priorities of a logical channel/logical channels to which uplink data or downlink data correspond, and the priority of the scheduling request is the priority of the logical channel triggering the scheduling request, these conditions/events including at least one of the following: DL or UL data arrival during RRC_CONNECTED when UL synchronisation status is "non-synchronised", or UL data arrival during RRC_CONNECTED when there are no PUCCH resources for SR available;
  a priority/priorities of a random access preamble(s) of a condition/event scheduling request failure triggering the random access procedure is/are a priority of a logical channel triggering the scheduling request failure, and a priority of the scheduling request is a priority of a logical channel triggering the SR; or
  a priority/priorities of a random access preamble(s) of a condition/event request for other SI triggering the random access procedure is/are lower than the priority of the scheduling request.

Supplement 39. The method according to any one of supplements 1-36, wherein in a case where the first information is a scheduling request and the second information is an MAC PDU or a UL-SCH resource, or the first information is an MAC PDU or a UL-SCH resource and the second information is a scheduling request, a preferential order or priority of the scheduling request is the priority of the logical channel triggering the scheduling request, and a preferential order or priority of the MAC PDU or UL-SCH resource is a priority of an MAC CE or logical channel data or padding bits contained therein.

Supplement 40. The method according to any one of supplements 1-36, wherein in a case where the first information is a random access preamble and the second information is an MAC PDU or a UL-SCH resource, or the first information is an MAC PDU or a UL-SCH resource and the second information is a random access preamble, a preferential order or priorities is/are determined in at least one of the following manners that:
  a priority of the random access preamble of the following conditions/events triggering the random access procedure is higher than a priority of the MAC PDU or the UL-SCH resource or the logical channel data, the conditions/events including at least one of the following: initial access from RRC_IDLE, RRC connection re-establishment procedure, handover, request by RRC upon synchronous reconfiguration, transition from RRC_INACTIVE, to establish time alignment at SCell addition, or beam failure recovery;

the priority/priorities of the random access preamble(s) of the following conditions/events triggering the random access procedure is/are priority/priorities of a logical channel/logical channels to which uplink data or downlink data correspond, these conditions/events including at least one of the following: DL or UL data arrival during RRC_CONNECTED when UL synchronisation status is "non-synchronised", or UL data arrival during RRC_CONNECTED when there are no PUCCH resources for SR available;

a priority/priorities of a random access preamble(s) of a condition/event scheduling request failure triggering the random access procedure is/are a priority of a logical channel triggering the SR; or a priority/priorities of a random access preamble(s) of a condition/event request for other SI triggering the random access procedure is/are lower than a priority of the MAC PDU or the UL-SCH resource or the logical channel data.

Supplement 41. The method according to any one of supplements 1-36, wherein in a case where the first information is an MAC PDU and the second information is an MAC PDU or a UL-SCH resource, or the first information is an MAC PDU or a UL-SCH resource and the second information is an MAC PDU, a preferential order or priority of the MAC PDU or UL-SCH resource is a priority of an MAC CE or logical channel data or padding bits contained therein.

Supplement 42. A method for transmitting an uplink signal, including:

in an MAC layer, determining by a terminal equipment that a first time-frequency resource at least partially overlaps a second time-frequency resource in a time domain or a time-frequency domain;

in the MAC layer, comparing first information related to the first time-frequency resource and second information related to the second time-frequency resource by the terminal equipment; and from the MAC layer, instructing a physical layer by the terminal equipment to transmit a first uplink signal related to the first information on the first time-frequency resource and/or transmit a second uplink signal related to the second information on the second time-frequency resource, or instructing a physical layer to transmit a third uplink signal related to the first information and the second information on the first time-frequency resource or the second time-frequency resource.

Supplement 43. The method according to supplement 42, wherein the method further includes:

transmitting, in the physical layer, the first uplink signal on the first time-frequency resource and/or transmitting the second uplink signal on the second time-frequency resource, or transmitting a third uplink signal related to the first information and the second information on the first time-frequency resource or the second time-frequency resource, by the terminal equipment.

Supplement 44. The method according to supplement 42 or 43, wherein the method further includes:

indicating, from the MAC layer by the terminal equipment, to the physical layer information related to the first uplink signal or the first information or the priority of the first time-frequency resource, and/or, information related to the second uplink signal or the second information or the priority of the second time-frequency resource.

Supplement 45. The method according to any one of supplements 42-44, wherein the priority of the second time-frequency resource is higher than the priority of the first time-frequency resource.

Supplement 46. The method according to any one of supplements 42-44, wherein the priority of the second time-frequency resource is higher than or equal to the priority of the first time-frequency resource.

Supplement 47. The method according to any one of supplements 42-44, wherein the priority of the second time-frequency resource is equal to the priority of the first time-frequency resource.

Supplement 48. The method according to any one of supplements 42-47, wherein the first uplink signal or the second uplink signal includes at least one of the following: a physical random access channel (PRACH), a physical uplink control channel (PUCCH), or a physical uplink shared channel (PUSCH).

Supplement 49. The method according to any one of supplements 42-48, wherein the first information or the second information includes at least one of the following: a random access preamble, a scheduling request (SR), a medium access control (MAC) protocol data unit (PDU), data in a logical channel, an uplink shared channel (UL-SCH) resource, or channel state information (CSI).

Supplement 50. The method according to any one of supplements 42-49, wherein the preferential order of the first information and the second information is determined according to the medium access control (MAC) protocol data unit (PDU) and/or the uplink shared channel (UL-SCH) resource and/or the logical channel priority and/or a triggering event.

Supplement 51. The method according to any one of supplements 42-49, wherein a first priority of the first information and a second priority of the second information are respectively determined according to the medium access control (MAC) protocol data unit (PDU) and/or the uplink shared channel (UL-SCH) resource and/or the logical channel priority and/or a triggering event; and the first priority of the first information and the second priority of the second information are compared to determine the preferential order of the first information and the second information.

Supplement 52. The method according to any one of supplements 42-51, wherein the first information and the second information are compared according to the medium access control (MAC) protocol data unit (PDU) and/or the uplink shared channel (UL-SCH) resource and/or the logical channel priority and/or the triggering event.

Supplement 53. The method according to any one of supplements 49-52, wherein the MAC PDU or the UL-SCH resource includes at least one of the following: an MAC CE (control element), data to which a logical channel corresponds, or padding.

Supplement 54. The method according to any one of supplements 49-53, wherein in a case where the first information and/or the second information are/is a scheduling request/scheduling requests, the preferential order or priority/priorities of the first information and/or the second information is/are determined according to the priority of the logical channel triggering the scheduling request(s).

Supplement 55. The method according to any one of supplements 49-53, wherein when the first information and/or the second information are/is a random access preamble/random access preambles, the preferential order or the priorities of the first information and/or the second information is/are determined according to a condition/event triggering the random access procedure.

Supplement 56. The method according to supplement 55, wherein priority/priorities of random access preamble(s) of the following conditions/events triggering the random access procedure is/are higher than the priority of the MAC PDU or the UL-SCH resource or the logical channel data, these conditions/events including at least one of the following: initial access from RR_IDLE, RRC connection re-establishment procedure, handover, request by RRC upon synchronous reconfiguration, transition from RRC_INACTIVE, to establish time alignment at SCell addition, or beam failure recovery.

Supplement 57. The method according to supplement 55, wherein the priority/priorities of the random access preamble(s) of the following conditions/events triggering the random access procedure is/are priority/priorities of a logical channel/logical channels to which uplink data or downlink data correspond, these conditions/events including at least one of the following: DL or UL data arrival during RRC_CONNECTED when UL synchronisation status is "non-synchronised", or UL data arrival during RRC_CONNECTED when there are no PUCCH resources for SR available.

Supplement 58. The method according to supplement 55, wherein a priority/priorities of a random access preamble(s) of a condition/event scheduling request failure triggering the random access procedure is/are a priority of a logical channel triggering the scheduling request.

Supplement 59. The method according to supplement 55, wherein a priority/priorities of a random access preamble(s) of a condition/event request for other SI triggering the random access procedure is/are lower than the priority of the MAC PDU or the UL-SCH resource or the logical channel.

Supplement 60. The method according to any one of supplements 49-53, wherein in a case where no MAC PDU is generated/assembled/obtained, a highest priority in priority/priorities of one or more logical channels is taken as the priority of the UL-SCH resource.

Supplement 61. The method according to any one of supplements 49-53, wherein in a case where no MAC PDU is generated/assembled/obtained, a highest priority in priority/priorities of one or more logical channels satisfying a logical channel processing (LCP) mapping restriction(s) of a first time-frequency resource/a second time-frequency resource is taken as the priority of the UL-SCH resource.

Supplement 62. The method according to any one of supplements 49-53, wherein in a case where no MAC PDU is generated/assembled/obtained, a highest priority in priority/priorities of one or more logical channels satisfying an LCP mapping restriction(s) of a first time-frequency resource/a second time-frequency resource and having data to be transmitted is taken as the priority of the UL-SCH resource.

Supplement 63. The method according to supplement 53, wherein in a case where the MAC PDU or the UL-SCH resource contains data to which the logical channel corresponds but does not contain an MAC CE, a highest priority in priorities of one or more logical channels is taken as a priority of the MAC PDU or the UL-SCH resource.

Supplement 64. The method according to supplement 53, wherein in a case where the MAC PDU or the UL-SCH resource contains an MAC CE but does not contain data to which the logical channel corresponds, a highest priority in priorities of one or more MAC CEs is taken as a priority of the MAC PDU or the UL-SCH resource.

Supplement 65. The method according to supplement 53, wherein in a case where the MAC PDU or the UL-SCH resource contains an MAC CE but does not contain data to which the logical channel corresponds, a highest priority in priorities of one or more MAC CEs is configured by a network device, or is determined according to a type of the MAC CE.

Supplement 66. The method according to supplement 65, wherein a preferential order of different MAC CEs is:
a C-RNTI MAC CE;
a configured grant confirmation MAC CE;
an MAC CE for BSR, with exception of BSR included for padding;
a single entry PHR MAC CE or multiple entry PHR MAC CEs;
an MAC CE for recommended bit rate query; and
an MAC CE for BSR included for padding.

Supplement 67. The method according to supplement 53, wherein in a case where the MAC PDU or the UL-SCH resource contains data to which the logical channel corresponds and contains an MAC CE, a highest priority in priorities of one or more logical channels is taken as a priority of the MAC PDU or the UL-SCH resource, or, a highest priority in priorities of one or more MAC CEs is taken as a priority of the MAC PDU or the UL-SCH resource.

Supplement 68. The method according to supplement 53, wherein in a case where the MAC PDU or the UL-SCH resource contains data to which the logical channel corresponds and contains an MAC CE, a highest priority in priorities of one or more logical channels and one or more MAC CEs is taken as a priority of the MAC PDU or the UL-SCH resource.

Supplement 69. The method according to supplement 53, wherein in a case where the MAC PDU or the UL-SCH resource contains data to which the logical channel corresponds and the MAC CE, a preferential order or priorities is/are determined according to types of the logical channel and the MAC CE.

Supplement 70. The method according to supplement 69, wherein a preferential order of different MAC CEs and logical channels is:
a C-RNTI MAC CE or data from a UL-CCCH;
a configured grant confirmation MAC CE;
an MAC CE for BSR, with exception of BSR included for padding;
a single entry PHR MAC CE or multiple entry PHR MAC CEs;
data from any logical channels except the UL-CCCH;
an MAC CE for recommended bit rate query; and
an MAC CE for BSR included for padding.

Supplement 71. The method according to supplement 53, wherein the preferential orders or priorities of the logical channel and MAC CE are predefined, or are configured by the network device.

Supplement 72. The method according to supplement 53, wherein in a case where the MAC PDU or the UL-SCH resource contains data to which the logical channel corresponds and contains an MAC CE, the data of the logical channel are at least divided into data from a first logical channel and data from a second logical channel, and the preferential order or the priorities are determined according to types of the logical channel and the MAC CE.

Supplement 73. The method according to supplement 72, wherein a value of a priority of a logical channel to which the first logical channel corresponds is lower than a first threshold, and a value of a priority of a logical channel to which the second logical channel corresponds is higher than or equal to the first threshold;

or, a transmission time length to which the first logical channel corresponds is lower than a second threshold, and a transmission time length to which the second logical channel corresponds is higher than or equal to the second threshold.

Supplement 74. The method according to supplement 72 or 73, wherein preferential orders of different MAC CEs and data of different logical channels are:

a C-RNTI MAC CE or data from a UL-CCCH;
a configured grant confirmation MAC CE;
an MAC CE for BSR, with exception of BSR included for padding;
a single entry PHR MAC CE or multiple entry PHR MAC CEs;
data from a first logical channel other than a UL-CCCH;
data from a second logical channel other than a UL-CCCH;
an MAC CE for recommended bit rate query; and
an MAC CE for BSR included for padding.

Supplement 75. The method according to supplement 72 or 73, wherein preferential orders of different MAC CEs and data of different logical channels are:

a C-RNTI MAC CE or data from a UL-CCCH;
data from a first logical channel other than a UL-CCCH;
a configured grant confirmation MAC CE;
an MAC CE for BSR, with exception of BSR included for padding;
a single entry PHR MAC CE or multiple entry PHR MAC CEs;
data from a second logical channel other than a UL-CCCH;
an MAC CE for recommended bit rate query; and
an MAC CE for BSR included for padding.

Supplement 76. The method according to any one of supplements 42-75, wherein in a case where both the first information and the second information are scheduling requests, SR1 and SR2, if a PUCCH resource to which configuration of SR corresponds overlaps with a PUCCH resource to which configuration of SR2 corresponds, when a priority of a logical channel triggering SR1 is higher than or equal to a priority of a logical channel triggering SR2, the MAC layer instructs the physical layer to transmit SR1 on the PUCCH resource to which SR1 corresponds;

or, the priority of the logical channel triggering SR1 and the priority of the logical channel triggering SR2 are compared, and for an SR triggered by a logical channel with a higher priority, the MAC layer instructs the physical layer to transmit the SR on the PUCCH resource to which the SR corresponds;

or, priorities of logical channels triggering the SR are ordered, and according to the preferential order, the MAC layer instructs the physical layer to transmit the SR on the PUCCH resource to which the SR corresponds.

Supplement 77. The method according to any one of supplements 42-75, wherein in a case where the first information is a random access preamble and the second information is a scheduling request, or the first information is a scheduling request and the second information is a random access preamble, the preferential order or the priorities is/are determined in at least one of the following manners that:

the priority of the random access preamble triggering the following condition/event of the random access procedure is higher than the priority of the scheduling request, the condition/event including at least one of the following: initial access from RRC_IDLE, RRC connection re-establishment procedure, handover, request by RRC upon synchronous reconfiguration, transition from RRC_INACTIVE, to establish time alignment at SCell addition, or beam failure recovery;

the priority/priorities of the random access preamble(s) of the following conditions/events triggering the random access procedure is/are priority/priorities of a logical channel/logical channels to which uplink data or downlink data correspond, and the priority of the scheduling request is the priority of the logical channel triggering the scheduling request, these conditions/events including at least one of the following: DL or UL data arrival during RRC_CONNECTED when UL synchronisation status is "non-synchronised", or UL data arrival during RRC_CONNECTED when there are no PUCCH resources for SR available;

a priority/priorities of a random access preamble(s) of a condition/event scheduling request failure triggering the random access procedure is/are a priority of a logical channel triggering the scheduling request failure, and a priority of the scheduling request is a priority of a logical channel triggering the scheduling request; or a priority/priorities of a random access preamble(s) of a condition/event request for other SI triggering the random access procedure is/are lower than the priority of the scheduling request.

Supplement 78. The method according to any one of supplements 42-75, wherein in a case where the first information is a scheduling request and the second information is an MAC PDU or a UL-SCH resource, or the first information is an MAC PDU or a UL-SCH resource and the second information is a scheduling request, a preferential order or priority of the scheduling request is the priority of the logical channel triggering the scheduling request, and a preferential order or priority of the MAC PDU or UL-SCH resource is a priority of an MAC CE or logical channel data or padding bits contained therein.

Supplement 79. The method according to any one of supplements 42-75, wherein in a case where the first information is a random access preamble and the second information is an MAC PDU or a UL-SCH resource, or the first information is an MAC PDU or a UL-SCH resource and the second information is a random access preamble, a preferential order or priorities is/are determined in at least one of the following manners that:

a priority of the random access preamble of the following conditions/events triggering the random access procedure is higher than a priority of the MAC PDU or the UL-SCH resource or the logical channel data, the conditions/events including at least one of the following: initial access from RRC_IDLE, RRC connection re-establishment procedure, handover, request by RRC upon synchronous reconfiguration, transition from RRC_INACTIVE, to establish time alignment at SCell addition, or beam failure recovery;

the priority/priorities of the random access preamble(s) of the following conditions/events triggering the random access procedure is/are priority/priorities of a logical channel/logical channels to which uplink data or downlink data correspond, these conditions/events including at least one of the following: DL or UL data arrival during RRC_CONNECTED when UL synchronisation status is "non-synchronised", or UL data arrival during RRC_CONNECTED when there are no PUCCH resources for SR available;

a priority/priorities of a random access preamble(s) of a condition/event scheduling request failure triggering the random access procedure is/are a priority of a logical channel triggering the SR; or a priority/priorities of a random access preamble(s) of a condition/event request for other SI triggering the random access procedure is/are lower than a priority of the MAC PDU or the UL-SCH resource or the logical channel data.

Supplement 80. The method according to any one of supplements 42-75, wherein in a case where the first information is an MAC PDU and the second information is an MAC PDU or a UL-SCH resource, or the first information is an MAC PDU or a UL-SCH resource and the second information is an MAC PDU, a preferential order or a priority of the MAC PDU or UL-SCH resource is a priority of an MAC CE or logical channel data or padding bits contained therein.

Supplement 81. A method for receiving an uplink signal, including:

transmitting configuration information or indication information by a network device to a terminal equipment, the configuration information or the indication information being at least used by the terminal equipment to compare first information related to a first uplink signal with second information related to a second time-frequency resource, or compare first information related to a first time-frequency resource with second information related to a second time-frequency resource; and receiving, by the network device, the first uplink signal and/or a second uplink signal related to the second information, or a third uplink signal related to the first information and the second information, transmitted by the terminal equipment.

Supplement 82. A terminal equipment, including a memory and a processor, the memory storing a computer program, and the processor being configured to execute the computer program to carry out the method for transmitting an uplink signal as described in any one of supplements 1-80.

Supplement 83. A network device, including a memory and a processor, the memory storing a computer program, and the processor being configured to execute the computer program to carry out the method for receiving an uplink signal as described in supplement 81.

Supplement 84. A communication system, including:

a terminal equipment configured to, from a media access control layer, instruct a physical layer to transmit a first uplink signal on a first time-frequency resource, in the media access control layer, determine that a second time-frequency resource at least partially overlaps the first time-frequency resource in a time domain or a time-frequency domain, and in the media access control layer, compare first information related to the first uplink signal and second information related to the second time-frequency resource; and a network device configured to receive the first uplink signal and/or the second uplink signal related to the second information.

Supplement 85. A communication system, including:

a terminal equipment configured to, in a media access control layer, determine that a first time-frequency resource at least partially overlaps a second time-frequency resource in a time domain or a time-frequency domain, in the media access control layer, compare first information related to the first time-frequency resource and second information related to the second time-frequency resource, and from the media access control layer, instruct a physical layer to transmit a first uplink signal related to the first information on the first time-frequency resource and/or transmit a second uplink signal related to the second information on the second time-frequency resource, or instruct a physical layer to transmit a third uplink signal related to the first information and the second information on the first time-frequency resource or the second time-frequency resource; and a network device configured to receive the first uplink signal and/or the second uplink signal, or the third uplink signal.

What is claimed is:

1. An apparatus for transmitting an uplink signal, comprising:

determining circuitry configured to, in a media access control layer, determine that a first time-frequency resource at least partially overlaps a second time-frequency resource in a time domain or a time-frequency domain;

comparing circuitry configured to, in the media access control layer, compare a first uplink grant related to the first time-frequency resource and a second uplink grant related to the second time-frequency resource; and instructing circuitry configured to, from the media access control layer, instruct a physical layer to transmit a first uplink signal related to the first uplink grant on the first time-frequency resource and/or transmit a second uplink signal related to the second uplink grant on the second time-frequency resource, wherein, in a case that a media access control (MAC) protocol data unit (PDU) is not generated/obtained, a highest priority in priorities of one or more logical channels that have data available for transmission and meet logical channel processing (LCP) mapping restrictions of the first uplink grant or the second uplink grant is taken as a priority of the first uplink grant or the second uplink grant.

2. The apparatus according to claim 1, wherein the first uplink signal or the second uplink signal comprises at least one of a physical random access channel (PRACH), a physical uplink control channel (PUCCH), or a physical uplink shared channel (PUSCH).

3. The apparatus according to claim 1, wherein the determining circuitry is further configured to respectively determine a first priority or preferential order of the first uplink grant and a second priority or preferential order of the second uplink grant, according to a priority of a logical channel; and the comparing circuitry is further configured to compare the first priority of the first uplink grant and the second priority of the second uplink grant to determine a preferential order of the first uplink grant or the first scheduling request and the second uplink grant or the second scheduling request.

4. The apparatus according to claim 1, wherein, in case that the first uplink grant is prioritized than the second uplink grant and a MAC PDU corresponding to the first uplink grant has been generated, the instructing circuitry is further configured to instruct the physical layer to transmit the first uplink signal related to the first uplink grant.

5. The apparatus according to claim 1, wherein, in case that the first uplink grant is prioritized than the second uplink grant and a MAC PDU corresponding to the first uplink grant has not been generated, the instructing circuitry is further configured to generate a MAC PDU corresponding to the first uplink grant and instruct the physical layer to transmit the first uplink signal related to the first uplink grant.

6. The apparatus according to claim 1, wherein the comparing circuitry is further configured to, in case that the second uplink grant is prioritized than the first uplink grant, generate a MAC PDU corresponding to the second uplink grant; and the instructing circuitry is further configured to instruct the physical layer to transmit the second uplink signal related to the second uplink grant on a second PUSCH resource.

7. The apparatus according to claim 1, wherein the instructing circuitry is further configured to indicate a priority or preferential order of an uplink grant to the physical layer.

8. The apparatus according to claim 1, wherein a priority is configured for the first time-frequency resource and/or the second time-frequency resource, and the priority is used for physical layer handling.

9. The apparatus according to claim 8, wherein the priority is a priority of the time-frequency resource, or a priority of PUSCH carried or to be carried in the time-frequency resource, or a priority of PRACH carried or to be carried in the time-frequency resource, or the processing capability of terminal that the time-frequency resource corresponds to.

10. The apparatus according to claim 8, wherein the priority is indicated by downlink control information (DCI) or is configured by radio resource control (RRC).

11. The apparatus according to claim 8, wherein, in a case that the priority of the second time-frequency resource is lower than or is equal to the priority of the first time-frequency resource, the MAC layer does not instruct the physical layer to transmit the second information related to the second time-frequency resource.

12. An apparatus for receiving an uplink signal, comprising:

transmitting circuitry configured to transmit configuration information or indication information to a terminal equipment, the configuration information or the indication information being at least used by the terminal equipment to compare a first uplink grant related to a first uplink signal with a second uplink grant related to a second time-frequency resource, or compare first related to a first time-frequency resource with second related to a second time-frequency resource; and receiving circuitry configured to receive the first uplink signal and/or a second uplink signal related to the second uplink grant, or a third uplink signal related to the first uplink grant and the second uplink grant, transmitted by the terminal equipment, wherein, in a case that a media access control (MAC) protocol data unit (PDU) is not generated/obtained, a highest priority in priorities of one or more logical channels that have data available for transmission and meet logical channel processing (LCP) mapping restrictions of the first uplink grant or the second uplink grant is taken as a priority of the first uplink grant or the second uplink grant.

13. A communication system, comprising:

a base station configured to transmit configuration information or indication information; and receive a first uplink signal related to a first uplink grant and/or a second uplink signal related to a second uplink grant, or a third uplink signal related to the first uplink grant and the second uplink grant; and a terminal device configured to, in a media access control layer, determine that a first time-frequency resource at least partially overlaps a second time-frequency resource in a time domain or a time-frequency domain; in the media access control layer, compare the first uplink grant related to the first time-frequency resource and the second uplink grant related to the second time-frequency resource; and from the media access control layer, instruct a physical layer to transmit the first uplink signal related to the first uplink grant on the first time-frequency resource and/or transmit the second uplink signal related to the second uplink grant on the second time-frequency resource, wherein, in a case that a media access control (MAC) protocol data unit (PDU) is not generated/obtained, a highest priority in priorities of one or more logical channels that have data available for transmission and meet logical channel processing (LCP) mapping restrictions of the first uplink grant or the second uplink grant is taken as a priority of the first uplink grant or the second uplink grant.

\* \* \* \* \*